(12) United States Patent
Simon et al.

(10) Patent No.: US 7,489,645 B2
(45) Date of Patent: Feb. 10, 2009

(54) MESH NETWORKS WITH END DEVICE RECOGNITION

(75) Inventors: Daniel R. Simon, Redmond, WA (US); Paramvir Bahl, Sammamish, WA (US); Helen Jiahe Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 10/738,802

(22) Filed: Dec. 17, 2003

(65) Prior Publication Data

US 2005/0135268 A1    Jun. 23, 2005

(51) Int. Cl.
    H04L 12/28    (2006.01)
(52) U.S. Cl. .................................. 370/254; 370/400
(58) Field of Classification Search .................. None
    See application file for complete search history.

(56) References Cited

U.S. PATENT DOCUMENTS

| | | | |
|---|---|---|---|
| 6,389,532 B1 | 5/2002 | Gupta et al. | |
| 6,397,329 B1 | 5/2002 | Aiello et al. | |
| 6,425,004 B1 | 7/2002 | Hardjono | |
| 6,853,988 B1 * | 2/2005 | Dickinson et al. | 705/75 |
| 6,879,574 B2 * | 4/2005 | Naghian et al. | 370/338 |
| 6,917,985 B2 | 7/2005 | Madruga et al. | |
| 7,047,409 B1 | 5/2006 | Aull et al. | |
| 7,096,359 B2 | 8/2006 | Agrawal et al. | |
| 7,181,614 B1 * | 2/2007 | Gehrmann et al. | 713/155 |
| 7,308,574 B2 * | 12/2007 | Dare et al. | 713/157 |
| 2002/0053020 A1 | 5/2002 | Teijido et al. | |
| 2002/0124169 A1 * | 9/2002 | Agrawal et al. | 713/168 |
| 2003/0235175 A1 | 12/2003 | Naghian et al. | |
| 2004/0139022 A1 | 7/2004 | Singer et al. | |
| 2004/0190468 A1 | 9/2004 | Saijonmaa | |
| 2005/0191990 A1 * | 9/2005 | Willey et al. | 455/411 |

OTHER PUBLICATIONS

Candolin, "A Security Architecture for wireless ad hoc networks", MILCOM 2002 Proceedings vol. 2, Oct. 7-10, 2002, vol. 2, pp. 1095-1100.

Chu, et al., "A Secure Multicast Protocol with Copyright Protection", ACM SIGCOMM Computer Communication Review, vol. 32, No. 2, Apr. 2002, pp. 42-60.

(Continued)

Primary Examiner—Wing F Chan
Assistant Examiner—Anthony Sol
(74) Attorney, Agent, or Firm—Lee & Hayes, PLLC

(57) ABSTRACT

An exemplary router performs actions including: receiving at least one certificate from an end device, the at least one certificate issued by another router; ascertaining if the other router is a member of a predetermined neighborhood; determining if the at least one certificate is valid; and if the other router is ascertained to be a member of the predetermined neighborhood and the at least one certificate is determined to be valid, recognizing the end device as privileged. An exemplary mesh router is capable of establishing a wireless mesh network with other mesh routers, the mesh router is further capable of designating a neighborhood administrator mesh router; and the mesh router is adapted to grant privileged status to a particular end device associated with a particular certificate issued by a particular mesh router when the particular mesh router is a member of a neighborhood of the designated neighborhood administrator mesh router.

35 Claims, 12 Drawing Sheets

OTHER PUBLICATIONS

Crepeau, et al., "A Certificate Revocation Scheme for Wireless Ad Hoc Networks", Proceedings of the 1st ACM workshop on Security of ad hoc and sensor networks, ACM Press, Oct. 2003, pp. 54-61.

Kaya, et al., "Secure Multicast Groups on Ad Hoc Networks", Proceedings of the 1st ACM workshop on Security of Ad Hoc and Sensor Networks, ACM Press, Oct. 2003, pp. 1-10.

Garefalakis, T. et al., "Securing Personal Area Networks," 13th IEEE Int'l. Symposium on Personal Indoor and Mobile Radio Communications, Sep. 15-18, 2002, Pavilhao Altantico, Lisboa, Portugal, vol. 3, pp. 1257-1259.

Kaprynski, M. et al., "Signalling-Efficient Signature Based PKI Authentication Method for Wireless Communication Systems," 5th European Personal Mobile Communications Conference 2003 (IEEE Conf. Publ. 492), Apr. 22-25, 2003, Glasgow, UK, pp. 501-505.

Yi, Seung et al., "Key Management for Heterogeneous Ad Hoc Wireless Networks," Proceedings 10th IEEE Int'l. Conference on Network Protocols, Nov. 12-15, 2002, Paris, France, pp. 202-203.

Munoz, Jose L. et al., "Certificate Revocation Policies for Wireless Communications," Proceedings of the IASTED Int'l. Conference Communication Systems and Networks, Sep. 9-12, 2002, Malaga, Spain, pp. 427-432.

Trask, N.T. et al., "Adapting Public Key Infrastructures to the Mobile Environment," Internet and Wireless Security, 2002, UK, ISBN: 0 85296 197 9, pp. 163-170.

Singh, Arun K., "Deployment of Public-Key Infrastructure in Wireless Data Networks," Networking—ICN 2001, First Int'l. Conference on Networking, Proceedings, Part II, Jul. 9-13, 2001, pp. 217-224.

Luo, et al., "Self-Securing Ad Hoc Wireless Networks", Jul. 1-4, 2002, pp. 567-574.

* cited by examiner

MESH NETWORKS WITH END DEVICE RECOGNITION

TECHNICAL FIELD

This disclosure relates in general to mesh networks and in particular, by way of example but not limitation, to enabling end devices affiliated with one mesh router to be recognized by other mesh routers within a given mesh network neighborhood.

BACKGROUND

Wireless networks are increasingly used for the communication of both voice and data. Such wireless communication is effectuated by propagating a wireless signal from a transmitter to a receiver, each of which may constitute a node of a wireless network. Nodes in a traditional cellular wireless network, for example, include fixed base stations and mobile stations. Mobile stations access the cellular wireless network via the fixed based stations. The base stations are operated by a network service provider that designs the cellular wireless network and is capable of controlling access to and/or employing security measures in the wireless network. In other words, a single entity operates multiple base stations on a large-scale basis and can therefore provide a degree of organization and a measure of security, as well as a level of overall network management for the cellular wireless network.

Other types of wireless networks, such as spontaneous wireless networks, do not ordinarily entail such large-scale planning, organization, or management. For example, ad hoc wireless networks are created by multiple devices that mutually decide to join together to form nodes of a wireless network, generally without prior or subsequent explicit agreement among owners of the multiple devices. Hence, there is no overarching operator or other entity to enforce network access rules, handle security issues, monitor standards-based requirements, or guarantee generally-accepted wireless network behavior. Legitimate and illegitimate participants of such ad hoc networks can therefore act carelessly, indiscriminately, or even maliciously without being subject to significant restraints or any real repercussions.

Accordingly, there is a need for schemes and/or techniques that can introduce a degree of control and/or accountability into spontaneously-formed wireless networks.

SUMMARY

In an exemplary router implementation, a router includes: at least one processor; and one or more media including processor-executable instructions that are capable of being executed by the at least one processor, the processor-executable instructions adapted to direct the router to perform actions including: receiving at least one certificate from an end device, the at least one certificate issued by another router; ascertaining if the other router is a member of a predetermined neighborhood; determining if the at least one certificate is valid; and if the other router is ascertained to be a member of the predetermined neighborhood and the at least one certificate is determined to be valid, recognizing the end device as having a privileged status; the privileged status relating to level of service.

In an exemplary mesh router implementation, a mesh router is capable of establishing a wireless mesh network with other mesh routers, the mesh router is further capable of designating a neighborhood administrator mesh router; and the mesh router is adapted to grant privileged status to a particular end device associated with a particular certificate issued by a particular mesh router when the particular mesh router is a member of a neighborhood of the designated neighborhood administrator mesh router.

In another exemplary mesh router implementation, a mesh router is configured to perform actions including: establishing a connection with an end device over a wireless link; receiving at least one certificate from the end device, the at least one certificate having a signature; performing a signature verification procedure on the signature of the at least one certificate; if the signature verification procedure is successful, granting the end device preferred access; and if the signature verification procedure fails, granting the end device standard access.

Other method, system, approach, apparatus, router, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
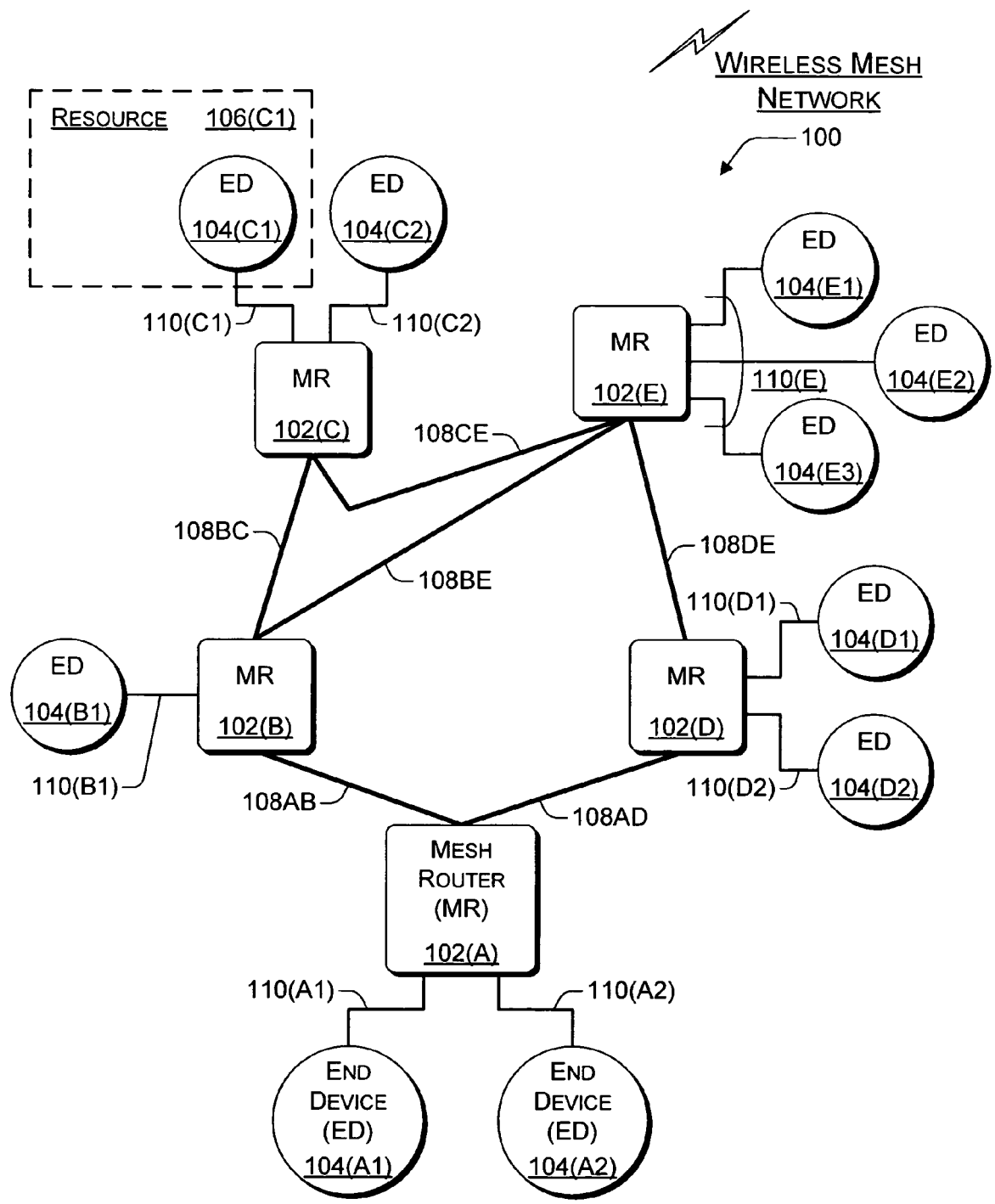
FIG. 1 is an exemplary wireless mesh network that includes a mesh router tier and an end device tier.

FIG. 1 is an exemplary wireless mesh network 100 that includes a mesh router tier and an end device tier. The mesh router tier is formed from mesh routers 102, which create a mesh router network portion of wireless mesh network 100. The end device tier is formed from end devices 104. End devices 104 may communicate with each other via one or more mesh routers 102 of the mesh router network.

As illustrated, five mesh routers 102(A), 102(B), 102(C), 102(D), and 102(E) form the mesh router network so as to realize at least a portion of a multi-hop wireless network. However, two or more mesh routers 102 (possibly tens, hundreds, thousands, etc.) may form the mesh router network. Each mesh router 102 is capable of communicating wirelessly using, for example, a wireless transmitter and/or receiver (e.g., a transceiver).

Mesh router 102(A) has a wireless link 108AB with mesh router 102(B) and a wireless link 108AD with mesh router 102(D). Mesh router 102(B) additionally has wireless links 108BC and 108BE with mesh routers 102(C) and 102(E), respectively. Similarly, mesh router 102(C) is also in wireless communication with mesh router 102(E) over wireless link 108CE, and mesh router 102(E) is also in wireless communication with mesh router 102(D) over wireless link 108DE.

Although each mesh router 102 is illustrated as being in wireless communication with from one to three end devices 104, each may alternatively be in communication with any number of end devices 104. Mesh router 102(A) is in wireless communication with two end devices 104(A1) and 104(A2) over wireless links 110(A1) and 110(A2), respectively. Mesh router 102(B) is in wireless communication with one end device 104(B1) over wireless link 110(B1). Mesh router 102 (C) is in wireless communication with two end devices 104 (C1) and 104(C2) over wireless links 110(C1) and 110(C2), respectively. Similarly, mesh router 102(E) has wireless links 100(E) with three end devices 104(E1), 104(E2), and 104 (E3). Mesh router 102(D) has wireless links 110(D1) and 110(D2) to two end devices 104(D1) and 104(D2), respectively.

In a described implementation, mesh routers 102 comprise a relatively standard set of devices from an operational perspective. For example, each mesh router 102 may have similar (or even identical) hardware and/or software. The hardware is capable of wireless communication and of executing the software (including firmware).

Mesh routers 102 are designed and/or manufactured by an entity to have at least a baseline set of interoperable capabilities. For example, a first production may result in identical mesh routers 102 from both a hardware and a software perspective for a first version. Available (e.g., software including firmware) upgrades may result in second and subsequent versions that offer optional additional capabilities. A second production may result in mesh routers 102 of later versions that differ from previous versions but are still backwards compatible. In short, the entity producing mesh routers 102 has some measure of determination regarding the hardware and software components thereof.

In contradistinction, end devices 104 comprise a relatively diverse set of devices that may have arbitrary hardware and software with haphazard operational capabilities. Each of end devices 104 may be a laptop, a mobile phone, a personal digital assistant (PDA), a home computer, an entertainment or other appliance, and so forth. End devices 104 may be executing any of a variety of operating systems, applications, managed program coding, and so forth. While otherwise diverse, such end devices 104 are capable of accessing wireless mesh network 100 using an accepted protocol via a mesh router 102.

An entity that is producing mesh routers 102 creates them such that a stable and predictable mesh router network is relatively automatically established. The stability and predictability of the wireless mesh router network is, of course, limited by the vagaries of wireless communication as impacted by distance between transmitter and receiver, interference, changes to the wireless medium, and so forth. Nevertheless, when a mesh router 102 is activated, it attempts to join a wireless mesh network 100 by communicating with any mesh routers 102 that are in range. Establishing wireless mesh network 100 is described further below with particular reference to FIGS. 2 and 3. Because the entity that is producing mesh routers 102 determines their operational capabilities, malicious or otherwise inappropriate network behavior can be reduced to some extent.

End devices 104, on the other hand, may be capable of practically arbitrary and/or systematic malicious actions because their operational capabilities are not centrally controlled. However, the actions of end devices 104 can be curtailed to some extent because end devices 104 connect to wireless mesh network 100 through a mesh router 102, as indicated by wireless links 110. It should be noted that the wireless access protocols governing (i) wireless links 110 for end device 104-to-mesh router 102 communications and (ii) wireless links 108 for intra-mesh router 102 communications may be the same or different.

By way of example, if end device 104(A1) is attempting to send a communication to end device 104(C1), end device 104(A1) transmits the communication to mesh router 102(A) over wireless link 110(A1). Mesh router 102(A) routes the communication to mesh router 102(C) via mesh router 102 (B) or mesh routers 102(D) and 102(E). Mesh router 102(C) then transmits the communication over wireless link 110(C1) to end device 104(C1).

As illustrated, end device 104(C1) comprises a resource 106(C1). Although only one resource 106 is shown, multiple resources 106 may be present in wireless mesh network 100 at the same or different mesh router(s) 102. Each resource 106 may be, for example, a local server or repository of information (e.g., for a subdivision), an Internet access point (ITap), a collection of multimedia data (e.g., that is of interest to a small community), and so forth.

Figure 2:
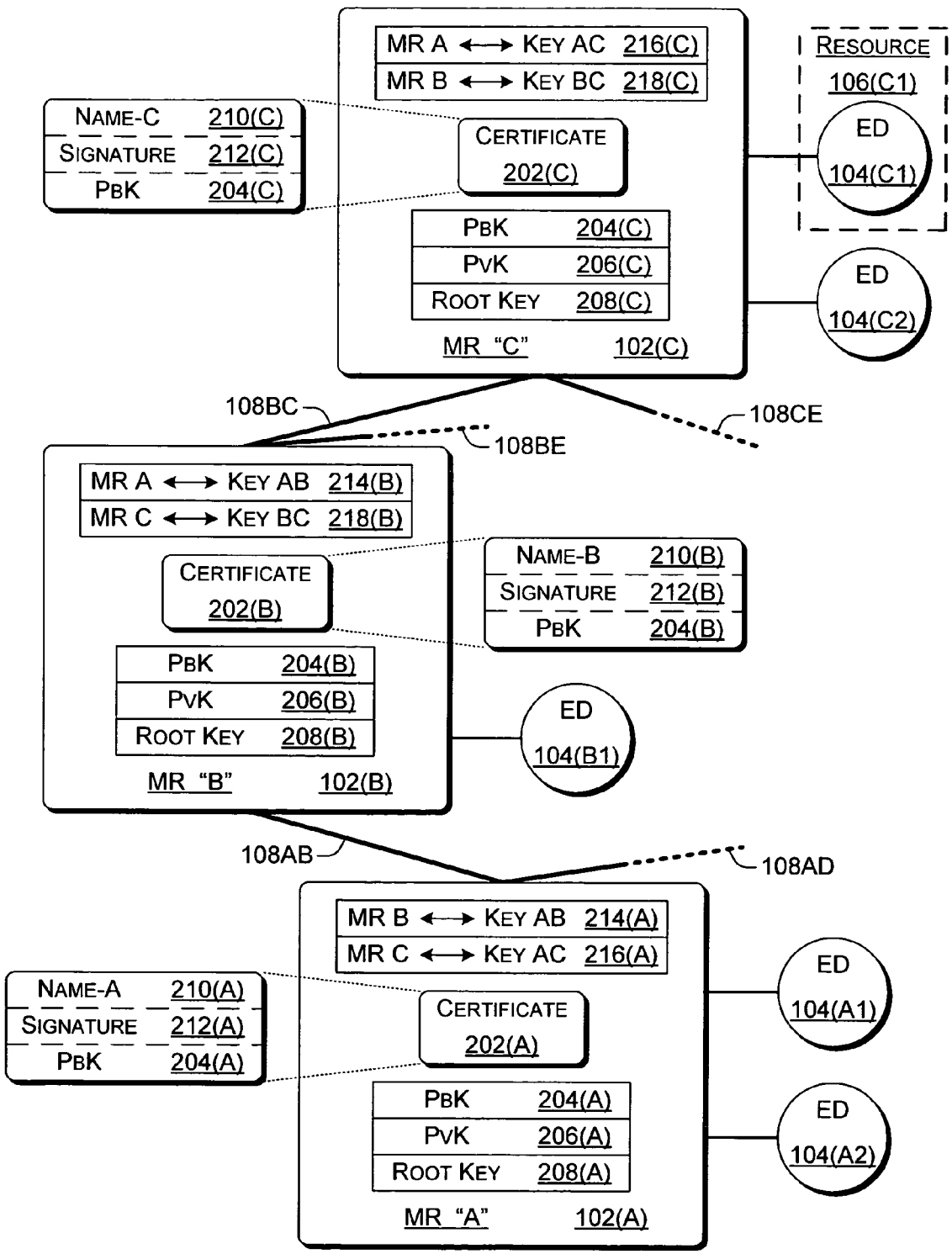
FIG. 2 illustrates an exemplary public key infrastructure (PKI) at the mesh router tier in which each mesh router is associated with a certificate.

FIG. 2 illustrates an exemplary public key infrastructure (PKI) at the mesh router tier in which each mesh router 102 is associated with a certificate 202. Three exemplary mesh routers 102(A), 102(B), and 102(C) are specifically shown. As illustrated, each mesh router 102 includes a certificate 202, a public key (PbK) 204, a private key (PvK) 206, and a root key 208. Each certificate 202 includes a name 210, a signature 212, and the corresponding public key 204. Mesh router "A" 102(A) is used in particular to describe these general aspects of the exemplary PKI at the mesh router tier.

In a described implementation for mesh router 102(A), the producing entity is associated with a signing key (not shown) and root key 208 that together form a public-private key pair for the producing entity. The producing entity signs certificate 202(A) with the private signing key to create signature 212 (A) by performing an operation on name—A 210(A). Certificate 202(A) certifies that public key 204(A) is bound to name—A 210(A), which is the name of mesh router 102(A). Name—A 210(A) may be, for example, a serial number of mesh router 102(A).

Certificate 202(A) represents that mesh router 102(A) is a valid mesh router 102 that is certified by the producing entity associated with root key 208. Certificate 202(A) therefore indicates that mesh router 102(A) should be allowed to join wireless mesh network 100 (of FIG. 1). In addition to certificate 202(A), mesh router 102(A) includes (e.g., stores) public key 204(A), private key 206(A), and root key 208(A). Private key 206(A) corresponds to public key 204(A), and together they form a public-private key pair that is associated with mesh router 102(A). Root key 208(A) is a copy, which is stored at mesh router 102(A), of the producing entity's root key 208.

In short, each mesh router 102 "ships" with an associated certificate 202. Hence, mesh router "B" 102(B) includes a certificate 202(B), and mesh router "C" 102(C) includes a certificate 202(C). Certificate 202(B) includes name—B 210 (B), signature 212(B), and public key 204(B) to indicate that mesh router 102(B) is a valid mesh router 102 from the producing entity and that it is bound to the private key 206(B) that corresponds to public key 204(B). Likewise, certificate 202(C) includes name—C 210(C), signature 212(C), and public key 204(C) to indicate that mesh router 102(C) is a valid mesh router 102 from the producing entity and that it is bound to the private key 206(C) that corresponds to public key 204(C).

When a mesh router 102 is activated, it attempts to contact other mesh routers 102 to establish (e.g., join) a wireless mesh network 100. When an activated mesh router 102 contacts another mesh router 102, the activated mesh router 102 and the other mesh router 102 perform an authentication/key exchange protocol. The two mesh routers 102 exchange certificates to indicate to each other that each is a valid mesh router 102 from the producing entity via a signature verification procedure using root key 208.

One or both mesh routers 102 then use the public key 204 of the other to establish a secret symmetric key that only the activated mesh router 102 and the other mesh router 102 share. The secret key may be established via a key transfer procedure or a key agreement procedure. The shared secret key is then used to authenticate each mesh router 102 to the other. The shared secret key may also be used to ensure confidentiality of information in a communication between the two mesh routers 102.

By way of example with mesh router 102(A), after being activated, it looks for and finds other mesh routers 102 that are in range and that are potential neighbors. With respect to mesh router 102(B), mesh routers 102(A) and 102(B) exchange certificates 202(A) and 202(B). After a secret key establishment procedure, key AB 214 is created and shared between mesh routers 102(A) and 102(B).

At mesh router 102(A), key AB 214(A) is stored in association with/mapped to mesh router "B". These mesh router-key mappings may be stored, for example, in a data structure. At mesh router 102(B), key AB 214(B) is stored in association with/mapped to mesh router "A". Key AB 214 may be used to authenticate mesh router 102(A) to mesh router 102(B), and vice versa, as well as optionally to ensure confidentiality of communication contents via encryption.

Likewise, mesh routers 102(A) and 102(C) exchange certificates 202(A) and 202(C). After a secret key establishment procedure, key AC 216 is created and shared between mesh routers 102(A) and 102(C). Key AC 216(A) is mapped to mesh router "C" at mesh router 102(A), and key AC 216(C) is mapped to mesh router "A" at mesh router 102(C). This authentication/key exchange protocol and key establishment procedure between mesh routers 102(A) and 102(C) may occur over the mesh router network portion of wireless mesh network 100 (e.g., via one or more mesh routers 102 such as mesh router 102(B)) even when mesh routers 102(A) and 102(C) are not within wireless range of each other. Similarly, after an exchange of certificates 202(B) and 202(C) and a secret key establishment procedure, key BC 218 is created and shared between mesh routers 102(B) and 102(C). Key BC 218(B) is mapped to mesh router "C" at mesh router 102(B), and key BC 218(C) is mapped to mesh router "B" at mesh router 102(C).

Figure 3:
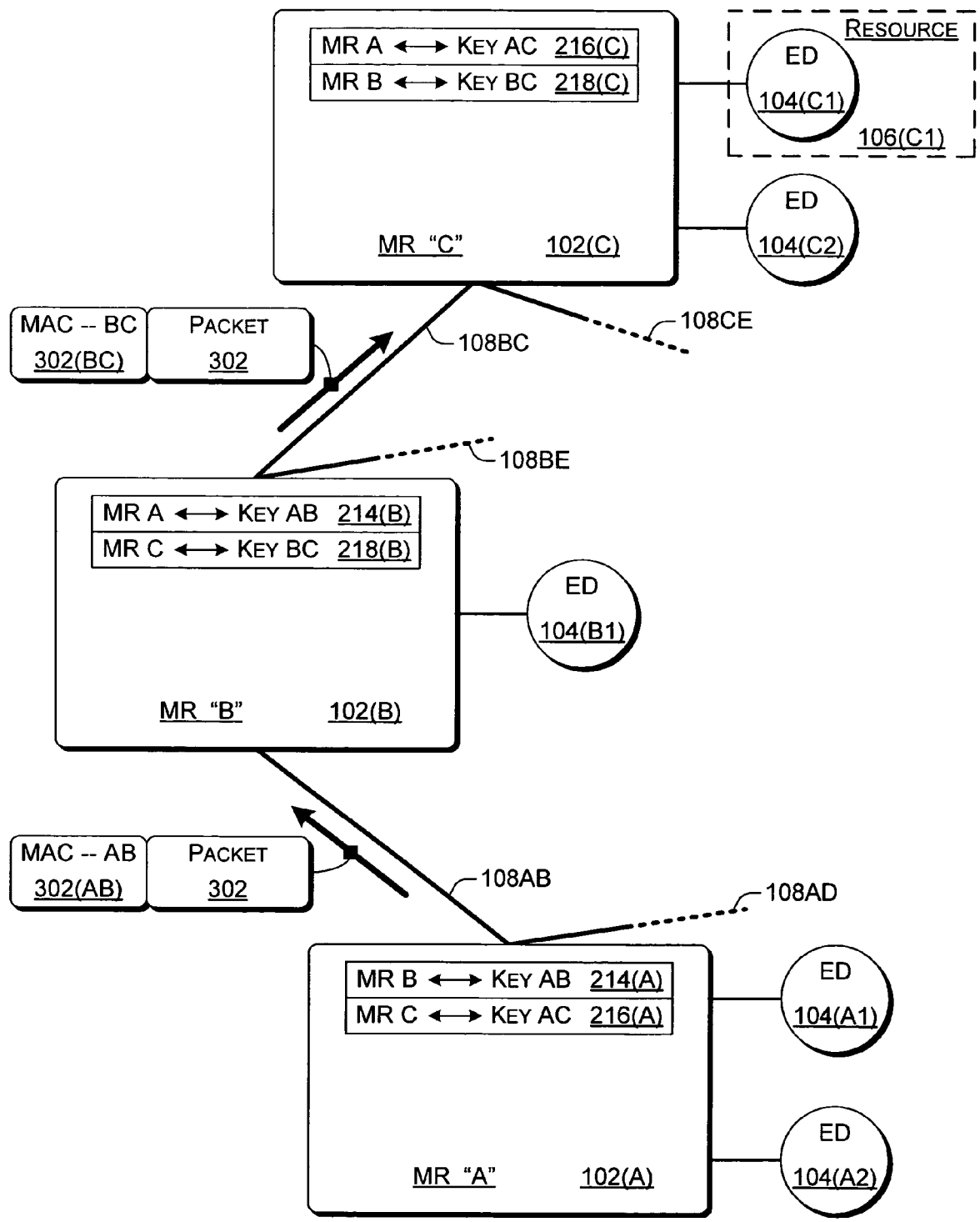
FIG. 3 illustrates an exemplary utilization of the PKI at the mesh router tier for the communication of a packet.

FIG. 3 illustrates an exemplary utilization of the PKI at the mesh router tier for the communication of a packet 302. Mesh router 102(A) is transmitting packet 302 to intended recipient mesh router 102(B). Packet 302 may be received at mesh router 102(A) from another mesh router 102, from an end device 104(A), etc.; may be originally formulated at mesh router 102(A); and so forth. Mesh router 102(A) tags packet 302 with a message authentication code (MAC).

Because packet 302 is being sent to mesh router 102(B) from mesh router 102(A), mesh router 102(A) looks up mesh router "B" in a data structure (e.g., a table) and ascertains the secret key that is shared between them. In this example, the shared secret key that mesh router 102(A) retrieves is key AB 214(A). Mesh router 102(A) therefore uses key AB 214(A) to create MAC-AB 302(AB). MAC-AB 302(AB) is then tagged onto packet 302 prior to transmission. Upon reception of packet 302, mesh router 102(B) accesses its secret key data structure at an entry for mesh router "A" to retrieve the shared secret key that is mapped thereto, which is key AB 214(B). Mesh router 102(B) uses key AB 214(B) along with MAC-AB 302(AB) to authenticate that packet 302 was sent from mesh router 102(A), which is a valid and uncompromised mesh router 102.

In this example, packet 302 is ultimately destined for resource 106(C1) at end device 104(C1), which is coupled to (and may be considered part of) wireless mesh network 100 at mesh router 102(C). Mesh router 102(B), having a routing capability for wireless mesh network 100, determines that packet 302 is to be sent to mesh router 102(C). Mesh router 102(B) therefore ascertains that key BC 218(B) is mapped to mesh router "C" and utilizes key BC 218(B) to create MAC-BC 302(BC). MAC-BC 302(BC) is tagged onto packet 302 and transmitted to mesh router 102(C). Mesh router 102(C) uses its stored key BC 218(C) to authenticate that packet 302 is received from a known and trusted mesh router 102(B).

Authentication is thusly performed on a hop-by-hop basis. Confidentiality (e.g., via encryption) of the information contents of a communication may also be performed on a hop-by-hop basis with each communication being encrypted by the shared secret key of each pair of adjacent mesh routers 102. Alternatively, encryption may be performed on an end-to-end basis. For example, because mesh routers 102(A) and 102(C) established a shared secret key AC 216, the contents of packet 302 may be encrypted using key AC 216. Consequently, intervening mesh routers 102 such as mesh router 102(B) are not able to understand the contents of packet 302 as it is routed through wireless mesh network 100 with end-to-end encryption.

Figure 4:
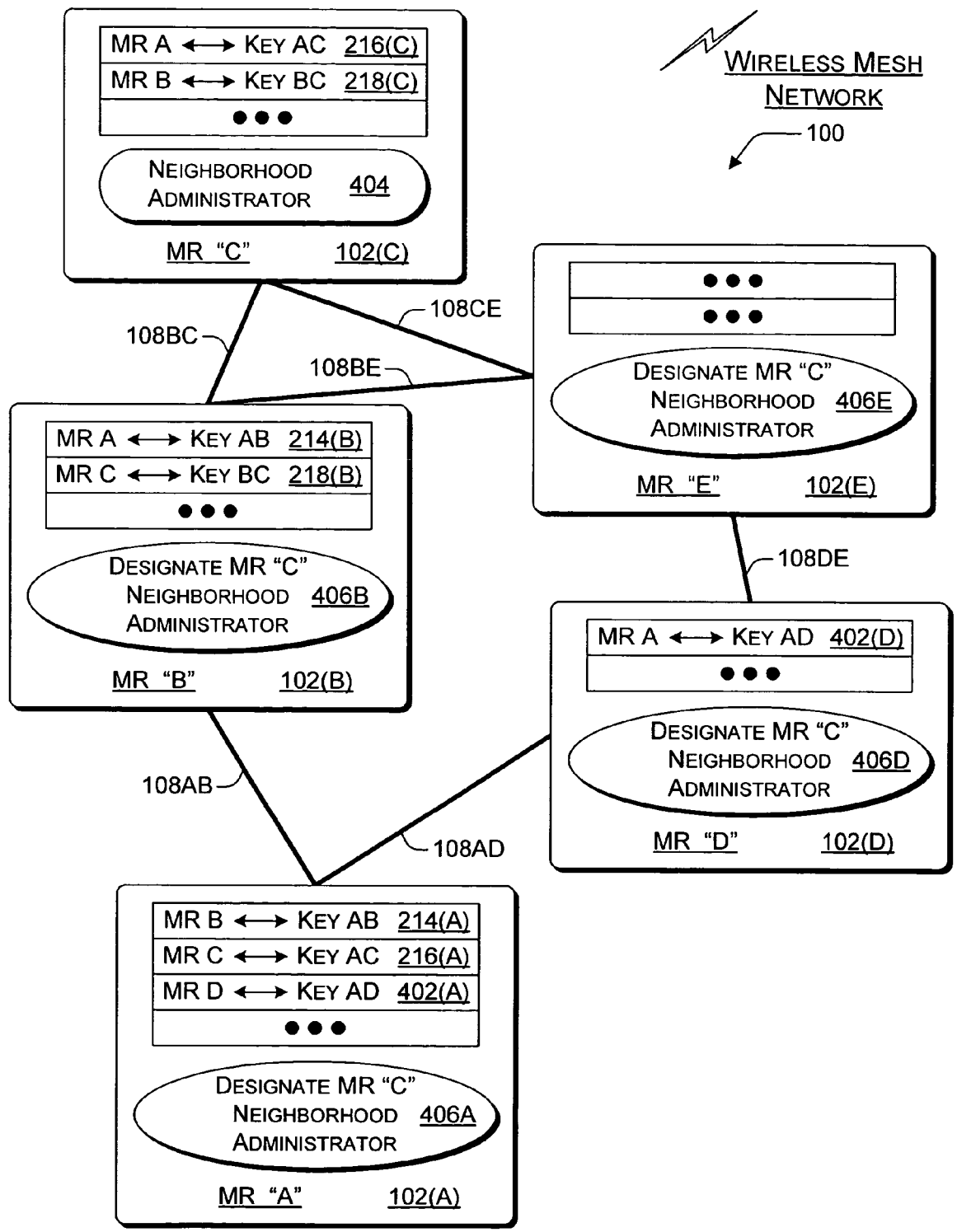
FIG. 4 illustrates an exemplary neighborhood establishment for the wireless mesh network.

FIG. 4 illustrates an exemplary neighborhood establishment for the wireless mesh network 100. Wireless mesh network 100 may organically grow unguided at an arbitrary rate and to a large, practically unbounded size. Furthermore, there is no centralized overall network administrator to ensure that the network continues to function smoothly. Mesh routers 102 are therefore empowered to establish quasi-official neighborhoods on a relatively democratic basis that appoint or designate an agreed-upon neighborhood administrator 404.

As illustrated in FIG. 4, mesh router 102(A) has also established shared secret key AD 402 with mesh router 102(D). Key AD 402(A) is mapped to mesh router "D" at mesh router 102(A), and key AD 402(D) is mapped to mesh router "A" at mesh router 102(D). The ellipses included in each mesh router-to-secret key mapping data structure represent the possible presence of additional entries. Such additional entries may be directed to other mesh routers 102 that are illustrated in FIG. 4 and other mesh routers 102 that are not specifically included in FIG. 4.

In a described implementation, mesh router 102(C) presents or offers itself as a neighborhood administrator 404 for a number of mesh routers 102 in wireless mesh network 100. Each mesh router 102 has a personal administrator (not shown) such as the owner thereof that manages the functioning of the respective mesh router 102 within the confines (hopefully) of permitted capabilities originally provided and enabled by the producing entity.

Each personal administrator of a mesh router 102 may select for designation a neighborhood administrator. Although not so illustrated in FIG. 4, the neighborhood administrator may not be physically located in the neighborhood being administered; for example, the neighborhood administrator may actually be an internet service. Regardless of physical location, the neighborhood administrator is to be trusted to manage the local neighborhood with respect to at least a subset of management decisions. This subset of management decisions includes the exclusion of a delinquent mesh router 102/certificate 202 as is described further below with particular reference to FIGS. 5-7. The size of the local neighborhood may be bounded by a predetermined (but alterable) number of hops from the neighborhood administrator.

In the example of FIG. 4, mesh router 102(C) is an available neighborhood administrator 404. Mesh routers 102(A), 102(B), 102(D), and 102(E) each designate mesh router "C" as the neighborhood administrator at 406A, 406B, 406D, and 406E, respectively. Consequently, until the neighborhood administrator designation is revoked, mesh routers 102(A), 102(B), 102(D), and 102(E) defer to mesh router 102(C) for the subset of management decisions. Optionally, each respective individual personal administrator may further identify selected ones of the subset of management decisions to which the respective mesh router 102 is to defer.

Figure 5:
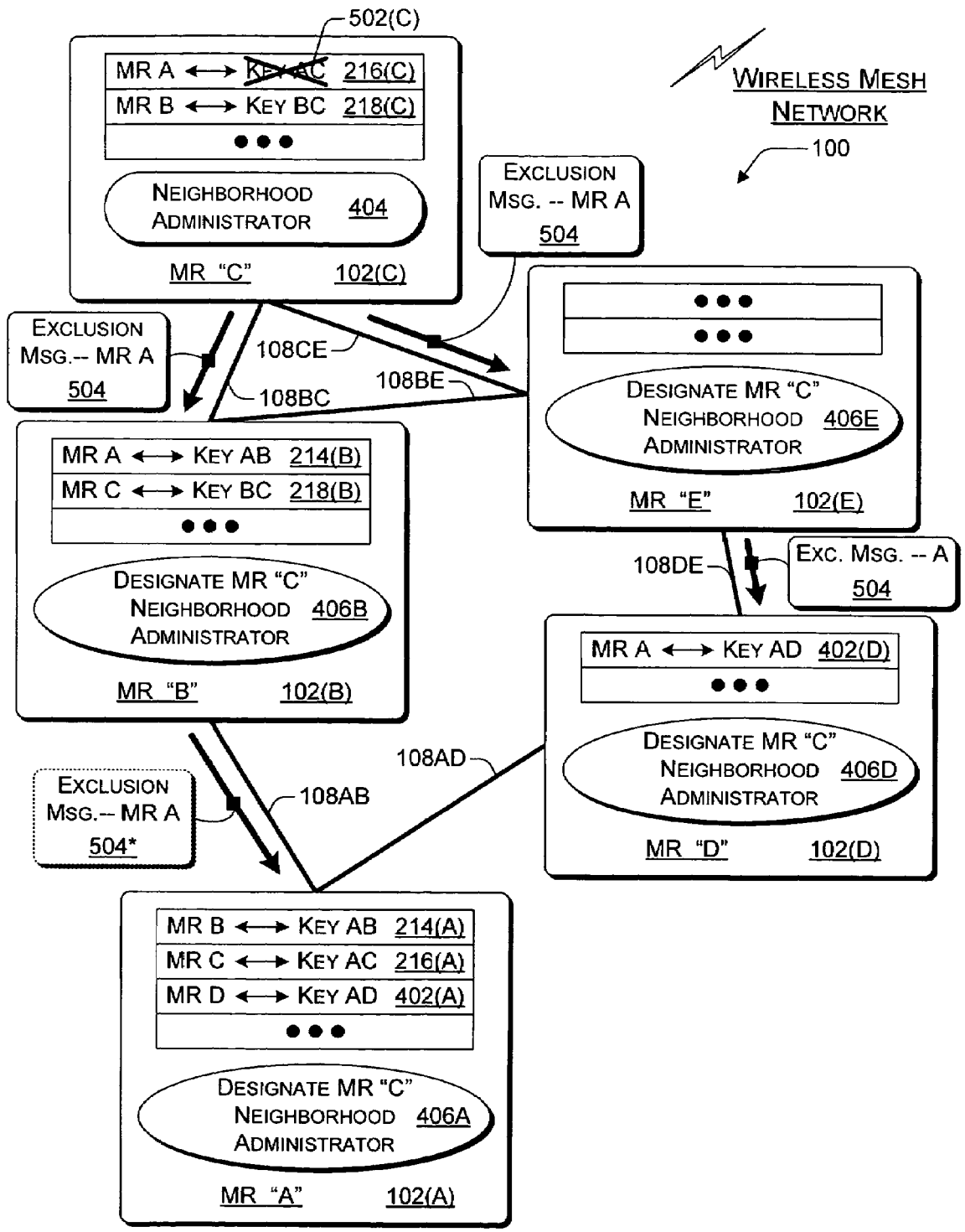
FIG. 5 illustrates an aspect of an exemplary exclusion mechanism with respect to a delinquent mesh router/certificate.

FIG. 5 illustrates an aspect of an exemplary exclusion mechanism with respect to a delinquent mesh router/certificate. A mesh router 102 may be acting outside the bounds of prescribed network behavior maliciously and intentionally, inadvertently and accidentally, some combination thereof, and so forth. In any case, the mesh router 102 that is engaging in proscribed network behavior may be considered delinquent. Accordingly, the certificate 202 that is associated with the delinquent mesh router 102 is also considered delinquent.

In a described implementation, delinquent behavior includes, but is not limited to: (i) transmitting at more than an allowed rate; (ii) attempting to send more than a maximum number of allowed packets over the mesh network in a given time period; (iii) refusing to communicate with a valid mesh router; (iv) dropping, including not forwarding, legitimate packets; (v) launching attacks against the network; (vi) a combination thereof; and so forth. Optionally, a local neighborhood and/or neighborhood administrator may selectively determine activities that qualify as delinquent, especially from among a list promulgated by the producing entity. A delinquent mesh router may be discovered using, for example, secure trace route, physical measurement, traffic flow monitoring, specialized mesh management tools (e.g., statistical analysis), notifications from other neighborhood administrators, some combination thereof, and so forth.

In the example illustrated in FIG. 5, mesh router 102(A) has been discovered to be delinquent. Consequently, mesh router 102(C) excludes certificate 202(A) (of FIG. 2) as indicated at 502(C). An exclusion indication is associated with/mapped to mesh router "A". The exclusion indication may be included in the same data structure that stores shared secret keys or a different data structure.

The producing entity originally issued certificate 202(A) to indicate the validity of mesh router 102(A) and to bind the public-private key thereof thereto. However, the exclusion of certificate 202(A) causes mesh router 102(C) (i) to consider certificate 202(A) to be invalid for wireless mesh network 100 purposes and (ii) to refuse to route traffic from the associated mesh router 102(A).

Mesh router 102(C) as neighborhood administrator 404 has an ability, if not a responsibility, to propagate the exclusion determination to mesh routers 102 in its neighborhood. Mesh router 102(C) broadcasts exclusion message 504 to mesh routers 102 in its neighborhood. Exclusion message— mesh router A 504 includes an identifier of mesh router 202(A) and/or certificate 202(A). This identifier includes, for example, name—A 210(A) (of FIG. 2), all or a portion of certificate 202(A), and so forth.

As illustrated in FIG. 5, mesh routers 102(B), 102(D), and 102(E) receive exclusion message—mesh router A 504. Optionally, an exclusion message—mesh router A 504\* may be sent to mesh router 102(A) to notify mesh router 102(A) and the personal administrator thereof of the exclusion of certificate 202(A) and the exclusion of mesh router 102(A). Exclusion message—mesh router A 504 may alternatively be sent to mesh routers 102 and/or the personal administrators thereof using some out-of-band avenue. Such avenues include e-mail, regular mail, instant messaging, telephone calling, and so forth.

Figure 6:
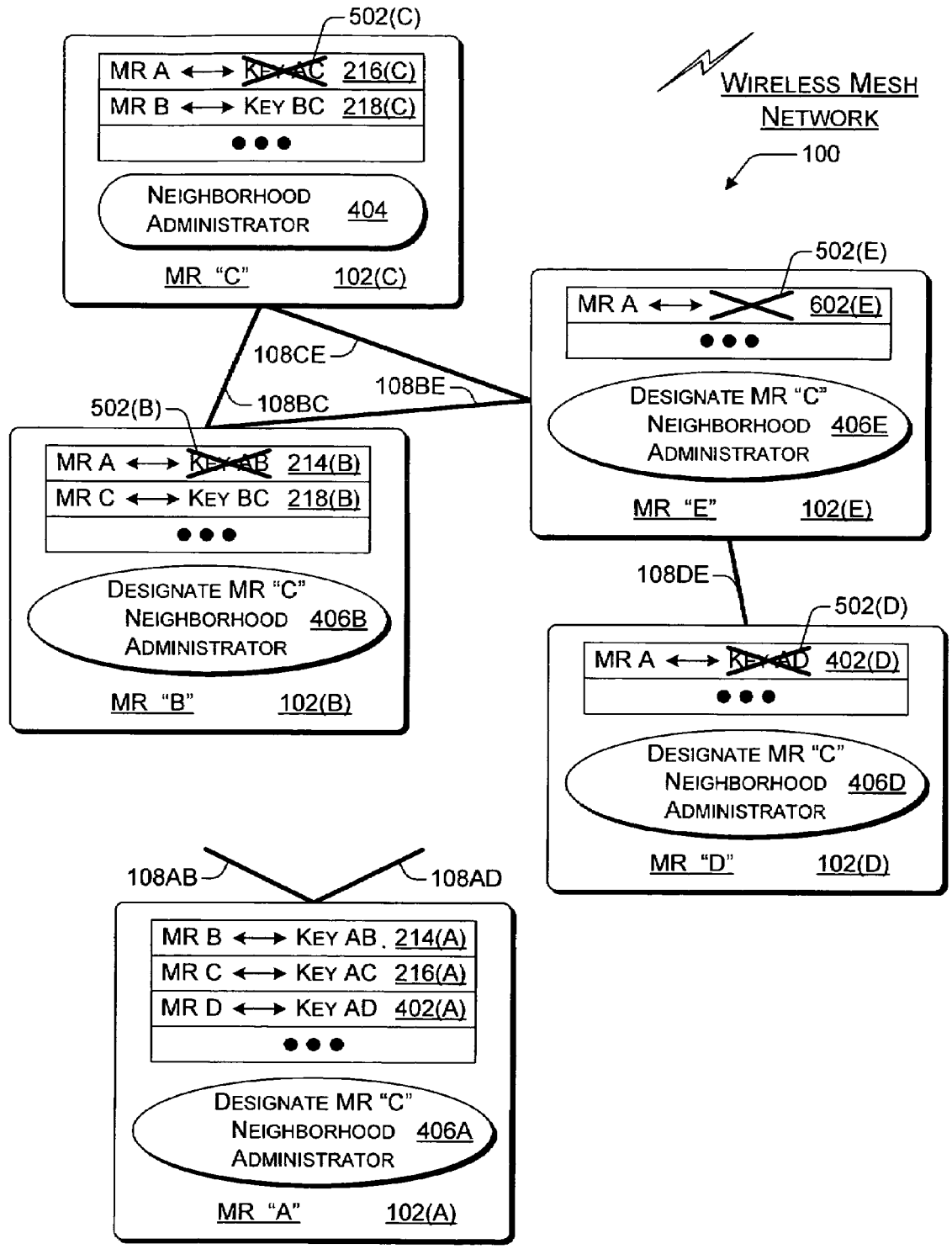
FIG. 6 illustrates another aspect of the exemplary exclusion mechanism with respect to the delinquent mesh router/certificate.

FIG. 6 illustrates another aspect of the exemplary exclusion mechanism with respect to the delinquent mesh router 102(A)/certificate 202(A). As described above with reference to FIG. 5, each of mesh routers 102(B), 102(D), and 102(E) receives exclusion message—mesh router A 504 from mesh router 102(C). In response to receiving exclusion message— mesh router A 504, each of mesh routers 102(B), 102(D), and 102(E) associates an exclusion indication with/maps an exclusion indication to mesh router "A" and/or certificate 202(A) at 502(B), 502(D), and 502(E), respectively.

If a shared secret key has already been established with mesh router 102(A) prior to receipt of exclusion message— mesh router A 504, then the shared secret key may be disregarded in the future. For example, at exclusion indications 502(B) and 502(D), key AB 214(B) and key AD 402(D) may be rendered irrelevant. Optionally, if such keys are not to be subsequently used e.g. for tracking purposes, key AB 214(B) and key AD 402(D) may be deleted.

As represented by the truncated wireless links 108AB and 108AD, mesh router 102(A) is excluded from the neighborhood for which mesh router 102(C) is the neighborhood administrator 404. For example, if mesh router 102(B) receives a packet 302 that is tagged with MAC-AB 302(AB), mesh router 102(B) refuses to route packet 302 any further (either to another mesh router 102 or end device 104(B1)).

If, on the other hand, a shared secret key has not already been established with mesh router 102(A) prior to receipt of exclusion message—mesh router A 504, then the exclusion indication may be mapped to an identifier of mesh router 102(A) and/or certificate 202(A), if provided in the message. This identifier may be name—A 210(A) (of FIG. 2) or all or part of certificate 202(A), for example. As illustrated in FIG. 6, an entry 602(E) of a data structure of mesh router 102(E) maps an identifier of mesh router "A" to exclusion indication 502(E). If mesh router 102(A) subsequently tries to communicate with mesh router 102(E) and offers certificate 202(A) as an indication of validity and trustworthiness, mesh router 102(E) refuses to perform an authentication/key exchange protocol with mesh router 102(A).

Figure 7:
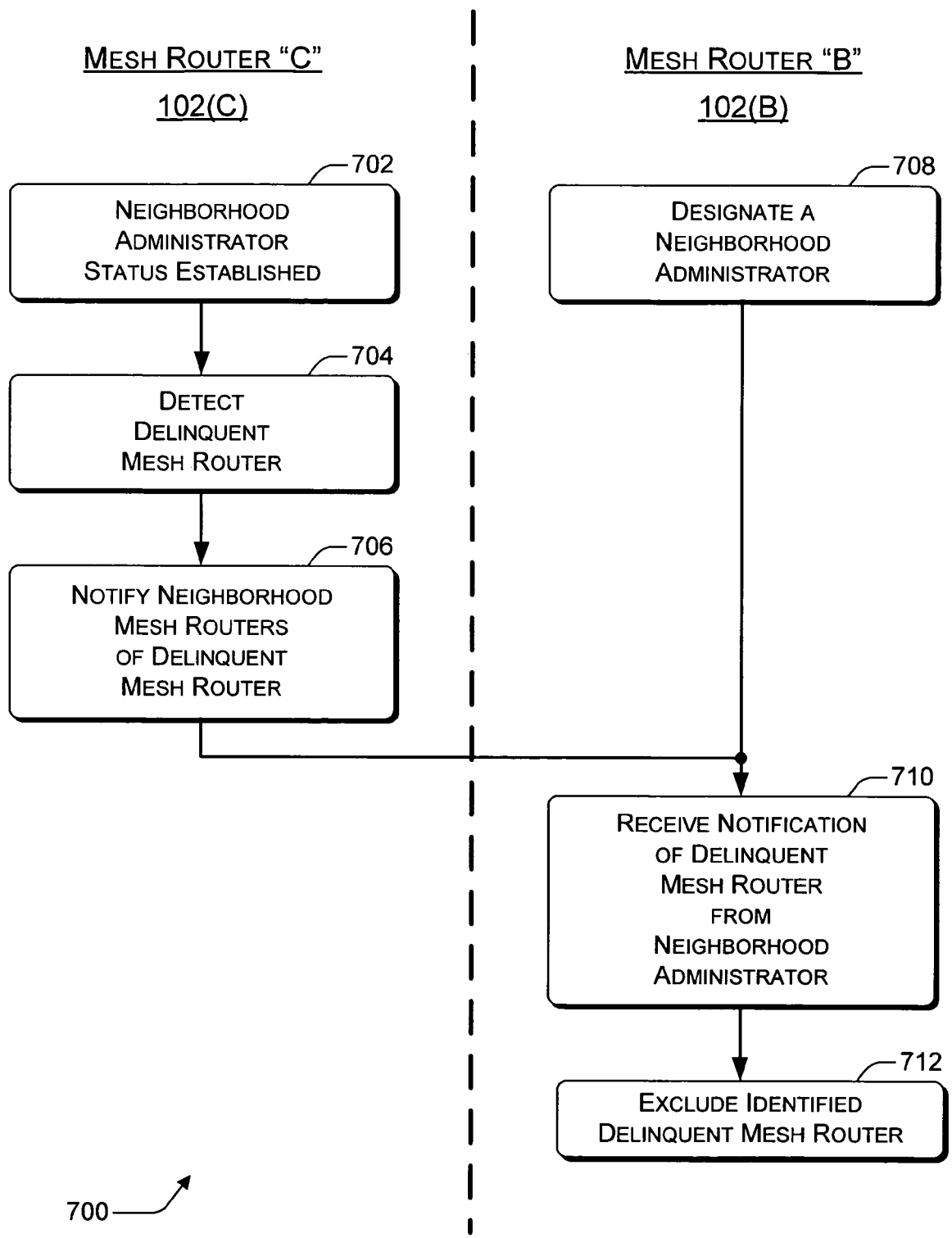
FIG. 7 is a flow diagram that illustrates an exemplary method for implementing an exclusion capability in a wireless mesh network.

FIG. 7 is a flow diagram 700 that illustrates an exemplary method for implementing an exclusion capability in a wireless mesh network. Flow diagram 700 includes six (6) blocks 702-712. Although the actions of blocks 702-712 may be performed in other implementations and environments, FIGS. 2-6 are used in particular to illuminate certain aspects of the method. For example, flow diagram 700 is divided into two parts: mesh router "C" 102(C) and mesh router "B" 102(B). As illustrated, mesh router "C" 102(C) performs the actions of three (3) blocks 702-706, and mesh router "B" 102(B) performs the actions of three (3) blocks 708-712.

At block 702, neighborhood administrator status is established. For example, mesh router "C" 102(C) may offer to be a neighborhood administrator 404, and at least one other mesh router 102 designates mesh router "C" 102(C) as the neighborhood administrator 404. An owner of a valued resource 106, for instance, may offer its mesh router 102 as a neighborhood administrator 404.

At block 704, a delinquent mesh router is detected. For example, it may be detected that mesh router 102(A) is delinquent through one or more of the above-described mechanisms. At block 706, neighborhood mesh routers are notified of the delinquent mesh router. For example, mesh router "C" 102(C) may broadcast an exclusion message—mesh router A 504 that identifies mesh router 202(A), such as by including certificate 202(A) in the message. Exclusion message—mesh router A 504 may be sent over wireless mesh network 100 or through some out-of-band avenue.

With respect to mesh router "B" 102(B), a neighborhood administrator is designated by the mesh router at block 708. For example, mesh router "B" 102(B) may designate mesh router "C" 102(C) as its designated neighborhood administrator 406B. The communication exchange that effectuates this designation informs mesh router "C" 102(C) that mesh router "B" 102(B) has joined its neighborhood. As a result, exclusion notifications that are provided (e.g., transmitted) by mesh router "C" 102(C) are targeted to mesh router "B" 102(B).

At block 710, the mesh router receives notification of a delinquent mesh router from the designated neighborhood administrator. For example, mesh router "B" 102(B) may receive exclusion message—mesh router A 504, which identifies certificate 202(A) of mesh router 102(A), from mesh router "C" 102(C). The exclusion message—mesh router A 504 may be signed by mesh router "C" 102(C) so that mesh router "B" 102(B) can authenticate that the exclusion notification originated from its designated neighborhood administrator 404.

At block 712, the mesh router excludes the identified delinquent mesh router based on the certificate that is associated with the identified delinquent mesh router. For example, mesh router "B" 102(B) may refuse to communicate with mesh router 102(A), including refusing to forward or otherwise route packets that are authenticated with certificate 202(A) or a secret key established therewith.

Certificate 202(A) is issued for mesh router 102(A) by the producing entity of mesh routers 102. Mesh router 102(C) notifies mesh router 102(B) of the exclusion status of certificate 202(A). Mesh router 102(B) consequently excludes certificate 202(A) based on this notification. This exclusion affects mesh router 102(A) or any mesh router 102 attempting to present certificate 202(A) as an indication of validity and trustworthiness. Thus, mesh router 102(B) effectively treats certificate 202(A) as being revoked and/or invalid based on notification from a non-issuing entity, namely mesh router 102(C), that has been designated by mesh router 102(B) to have this exclusion authority.

Figure 8:
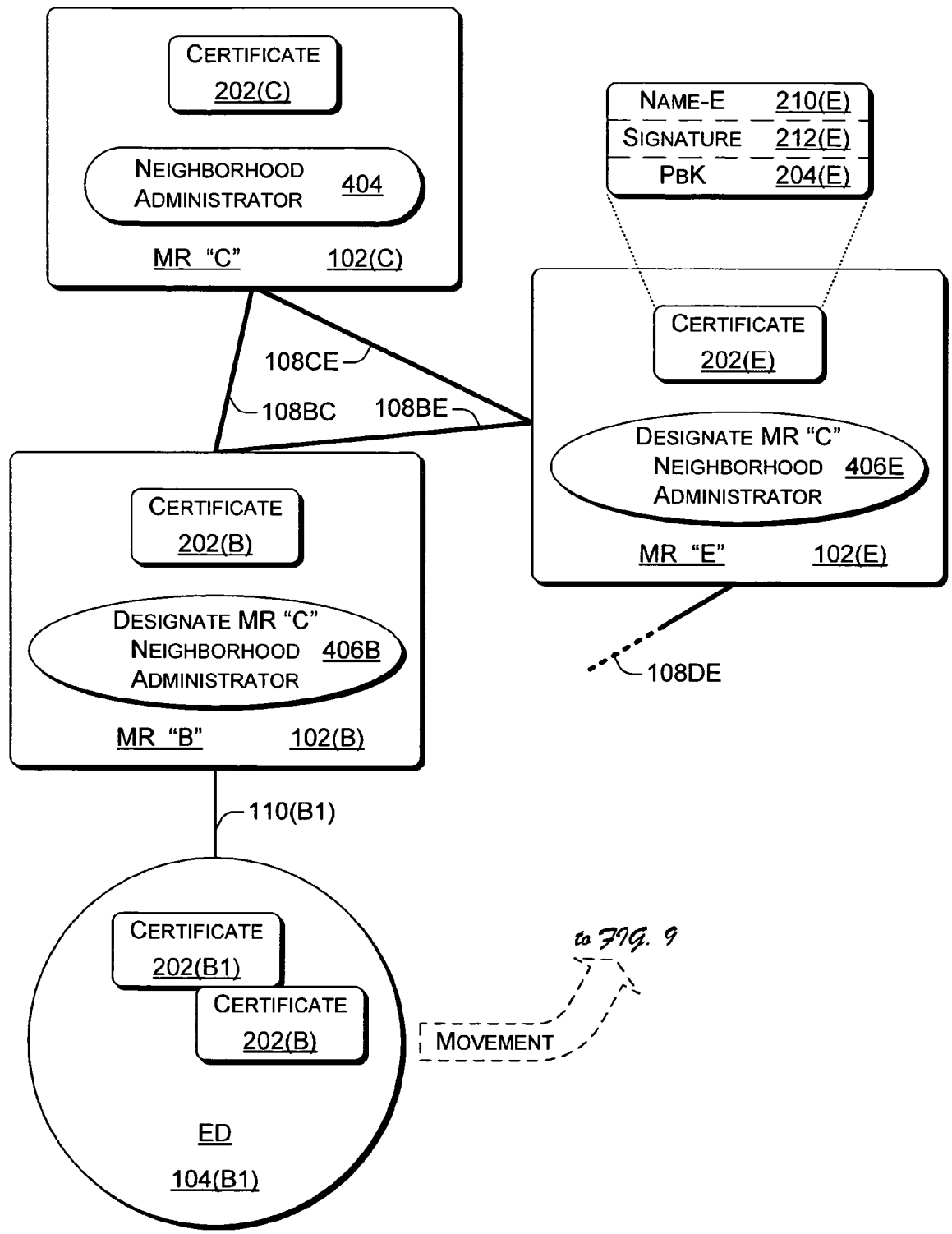
FIG. 8 illustrates an aspect of an exemplary recognition mechanism with respect to an end device.

FIG. 8 illustrates an aspect of an exemplary recognition mechanism with respect to an end device 104(B1). End device 104(B1) is in communication with mesh router 102(B) over wireless link 110(B1). The exemplary recognition mechanism enables end device 104(B1) to be specially recognized by multiple mesh routers 102 within a given neighborhood. For example, end device 104(B1) is affiliated with mesh router 102(B), which is a member of the neighborhood of mesh router 102(C). When end device 104(B1) moves to another mesh router 102, such as mesh router 102(E), that is part of the same neighborhood, the other mesh router 102 recognizes end device 104(B1) as a privileged end device 104. This movement to and recognition by mesh router 102(E) is specifically described further below with reference to FIG. 9.

As shown in FIG. 8, mesh router 102(E) is explicitly illustrated as including a certificate 202(E). Certificate 202(E) includes name—E 210(E), a signature 212(E), and public key 204(E). Public key 204(E) corresponds to a private key 206(E) (not explicitly shown) of mesh router 102(E). Certificates 202 are described generally above with particular reference to FIG. 2. End device 104(B1) is illustrated as including a certificate 202(B1) and (a copy of) certificate 202(B).

In a described implementation, mesh router 102(C) is the established neighborhood administrator 404 for a given neighborhood. The neighborhood of mesh router 102(C) includes mesh router 102(B), mesh router 102(E), mesh router 102(D) (e.g., of FIGS. 1, 4, and 5), mesh router 102(A) (e.g., if not excluded), and possibly other mesh routers 102 that are not specifically illustrated. Mesh routers 102 of the neighborhood of mesh router 102(C) have designated mesh router "C" as their neighborhood administrator at 406.

Forming a neighborhood is one approach to enabling implementation of the above-described exclusion capability. Neighborhood formation also enables another kind of cooperation between and among mesh routers 102 of a given neighborhood. For example, privileged access may be given by mesh routers 102 to end devices 104 that are affiliated with other mesh routers 102 of the same neighborhood.

In a described implementation, end devices 104 are granted access to wireless mesh network 100 (e.g., of FIG. 1) at different privilege/priority levels. For example, end devices 104 may be granted standard access or preferred access. A default access scenario enables any end device 104 to access wireless mesh network 100 at the standard access level. An elevated access scenario enables end devices 104 that are affiliated with a particular mesh router 102 of a given neighborhood to access any mesh router 102 of the given neighborhood at the preferred access level. Evidence of the affiliation of an end device 104 with a particular mesh router 102 of a given neighborhood is provided, at least partially, using the PKI of the mesh router tier.

End device 104(B1) is affiliated with mesh router 102(B). For example, a personal administrator of mesh router 102(B) may know or actually be the owner of end device 104(B1). Accordingly, the personal administrator may want end device 104(B1) to be entitled to preferred access to wireless mesh network 100 at least through mesh router 102(B). To provide end device 104(B1) with evidence of this affiliation, mesh router 102(B) issues a certificate 202(B1) that is signed by certificate 202(B) to end device 104(B1).

In other words, end device 104(B1) is issued and associated with certificate 202(B1) as signed by certificate 202(B). Hence, a name of certificate 202(B1) identifies end device 104(B1). A public key of certificate 202(B1) corresponds to a private key, with the resulting public-private key pair being associated with end device 104(B1). A signature of certificate 202(B1) is produced by a private key operation using private key 206(B) (of FIG. 2) of mesh router 102(B). End device 104(B1) can use certificate 202(B1) along with certificate 202(B) to demonstrate to mesh router 102(B) that it is affiliated therewith.

Certificates issued to end devices 104, such as certificate 202(B1), may be issued with an expiration date because they are likely less secure than certificates issued to mesh routers 102, such as mesh router 102(B), by the producing entity. Mesh router 102(B) may also delegate certificate-issuing authority to end device 104(B1). End device 104(B1) can subsequently issue additional certificates 202 to other end devices 104 to create a certificate chain. The certificate chain may be used for demonstrating end device 104 affiliation and securing recognition from non-affiliated mesh routers 102.

If a personal administrator of a given mesh router 102 learns that a particular end device certificate 202 issued by its given mesh router 102 is suspect (e.g., because the associated end device 104 is compromised), the personal administrator or given mesh router 102 thereof requests that the suspect end device certificate 202 be excluded. This request is made to the neighborhood administrator 404, which can then broadcast an exclusion notification message that identifies the suspect end device certificate 202.

End device 104(B1) can use certificate 202(B1) along with certificate 202(B) to demonstrate that it is also entitled to preferred access with non-affiliated mesh routers 102 that are in the neighborhood of mesh router 102(C). This may occur, for example, if mesh router 102(B) is non-functional and/or if end device 104(B1) moves out of range of mesh router 102(B). For instance, end device 104(B1) may move into range of mesh router 102(E).

Figure 9:
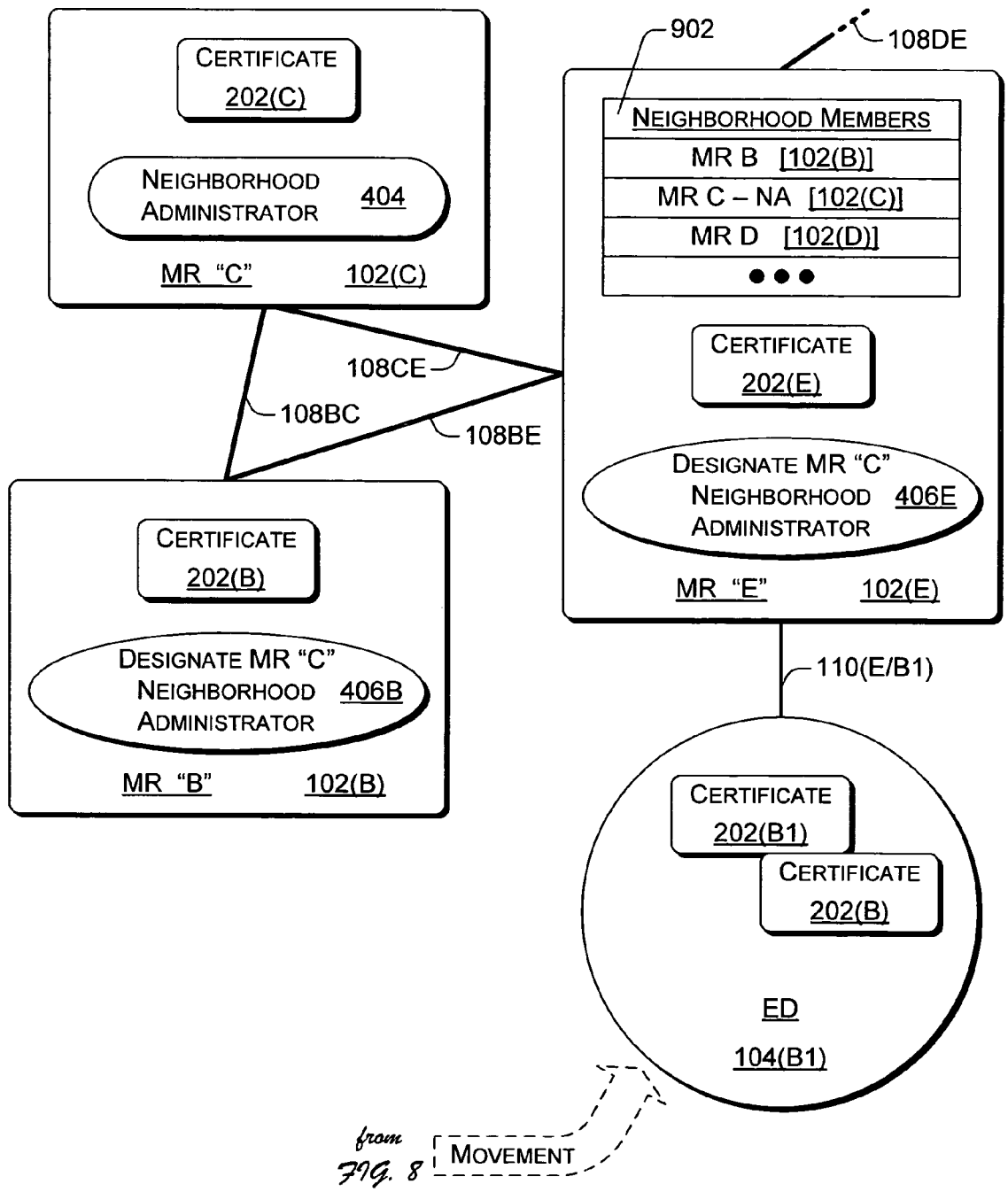
FIG. 9 illustrates another aspect of the exemplary recognition mechanism with respect to the end device.

FIG. 9 illustrates another aspect of the exemplary recognition mechanism with respect to end device 104(B1). As compared to FIG. 8, end device 104(B1) has moved into range of mesh router 102(E). End device 104(B1) is in communication with mesh router 102(E) over a wireless link 110(E/B1). The exemplary recognition mechanism enables end device 104(B1) to be specially recognized by mesh router 102(E) as being part of the neighborhood of mesh router 102(C).

Mesh router 102(E) includes a data structure 902 that lists or enumerates mesh routers 102 that are neighborhood members. In this example, the enumerated neighborhood members are those mesh routers 102 that have designated mesh router 102(C) as their neighborhood administrator at 406B, 406E, etc. Data structure 902 lists mesh router "B" [102(B)]; mesh router "C" [102(C)], which may be identified as the neighborhood administrator (NA); mesh router "D" [102(D)]; and so forth.

Data structure 902 may be part of and/or include other data structures, such as those data structures that store shared secret keys, those that store exclusion indications, and so forth. Although not so illustrated in FIG. 9, each mesh router 102 that is part of the neighborhood of mesh router 102(C) (e.g., mesh router 102(B)) also includes a data structure that is analogous to data structure 902.

In operation, end device 104(B1) and mesh router 102(E) set up wireless link 110(E/B1) therebetween. End device 104(B1) provides mesh router 102(E) with certificate 202(B) and certificate 202(B1). Based on certificate 202(B), mesh router 102(E) accesses data structure 902 to ascertain if the named mesh router, mesh router 102(B), is a member of the neighborhood of mesh router 102(C) to which mesh router 102(E) belongs. If data structure 902 includes mesh routers 102 that have been excluded, then mesh router 102(E) also checks to ensure that mesh router 102(B) has not been excluded.

Because mesh router 102(B) is a member of the neighborhood of mesh router 102(C) and is thus listed in neighborhood members data structure 902, mesh router 102(E) analyzes certificate 202(B). If mesh router 102(E) and mesh router 102(B) have previously performed a certificate exchange/key establishment procedure and if mesh router 102(E) stored a copy of certificate 202(B), mesh router 102(E) may merely compare the stored copy of certificate 202(B) to the copy of certificate 202(B) provided by end device 104(B1) to ensure the legitimacy of certificate 202(B). If not, then mesh router 102(E) performs a signature verification procedure on certificate 202(B) using its stored root key 208(E) (not explicitly illustrated) to validate certificate 202(B).

After mesh router 102(E) ascertains that mesh router 102(B) is a member of the same neighborhood and that the presented certificate 202(B) is legitimate/valid, mesh router 102(E) analyzes certificate 202(B1). Certificate 202(B1) is analyzed to ensure that certificate 202(B1) was issued by the mesh router 102(B) that is associated with certificate 202(B). Thus, mesh router 102(E) uses public key 204(B) of certificate 202(B) to perform a signature verification procedure on the signature of certificate 202(B1) to verify that the signature of certificate 202(B1) was signed by the corresponding private key 206(B) of neighborhood member mesh router 102(B).

If this signature verification procedure is successful, then mesh router 102(E) has determined that certificate 202(B1) is valid and that end device 104(B1) is affiliated with mesh router 102(B), which is a neighborhood member of the neighborhood of mesh router 102(C). Consequently, mesh router 102(E) grants end device 104(B1) preferred access instead of standard access. Mesh router 102(E) and end device 104(B1) may also perform a key establishment procedure to establish a shared secret key for authenticating/encrypting communications between the two nodes.

Privileged status relates to level of service such as being entitled to preferred access instead of merely standard access. Preferred access versus standard access may respectively comprise a faster data rate versus a slower data rate, a guaranteed throughput versus a best effort throughput, a higher priority for transmission/reception versus a lower priority for transmission/reception, some combination thereof, and so forth. Levels of service may also include more than two different levels of service/status.

It should be noted that preferred access versus standard access (or a greater number of different levels of service) for communicated traffic may be honored throughout wireless mesh network 100 by tagging traffic. For example, routers 102 can tag their transmitted packets by their individually determined classification (e.g., as "standard access rate" or "preferred access rate"). As a result, differences in packet classification can be respected throughout wireless mesh network 100, instead of merely at the router 102 where an end device 104 introduces the packets into wireless mesh network 100 and where the classification determination is made.

This exemplary recognition mechanism therefore enables an end device 104(B1) that is affiliated with a particular mesh router 102(B) to be specially recognized by other mesh routers 102 that are members of the same neighborhood, which is administered by mesh router 102(C). As a result, peers (e.g., mesh routers 102) of a first tier can issue certificates 202 hierarchically to a second different tier (e.g., to end devices 104) that are recognized by other peers of the first tier.

Figure 10:
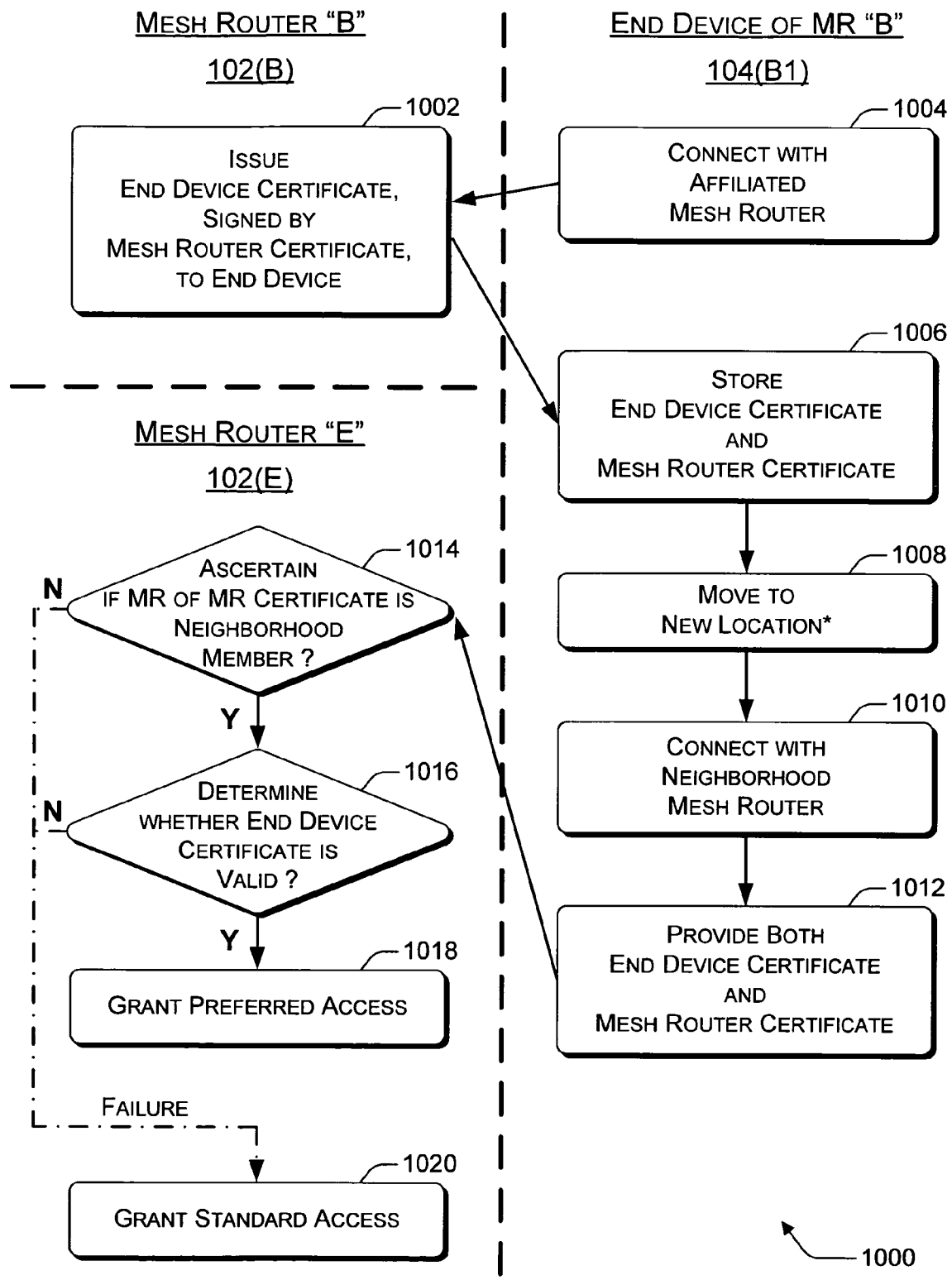
FIG. 10 is a flow diagram that illustrates an exemplary method for implementing end device recognition in a wireless mesh network.

FIG. 10 is a flow diagram 1000 that illustrates an exemplary method for implementing end device recognition in a wireless mesh network. Flow diagram 1000 includes ten (10) blocks 1002-1020. Although the actions of blocks 1002-1020 may be performed in other implementations and environments, FIGS. 2, 8, and 9 are used in particular to illuminate certain aspects of the method. For example, flow diagram 1000 is divided into three parts: mesh router "B" 102(B), end device 104(B1) of mesh router "B", and mesh router "E"

102(E). As illustrated, mesh router "B" 102(B) performs the action(s) of block 1002, end device 104(B1) of mesh router "B" performs the actions of five (5) blocks 1004-1012, and mesh router "E" 102(E) performs the actions of four (4) blocks 1014-1020.

At block 1004, an end device connects with an affiliated mesh router. For example, end device 104(B1) may connect with mesh router 102(B) over wireless link 110(B1). End device 104(B1) may be affiliated with mesh router 102(B) if the personal administrator of mesh router 102(B) knows or otherwise trusts the owner/operator of end device 104(B1).

At block 1002, the affiliated mesh router issues an end device certificate, which is signed by the mesh router certificate of the affiliated mesh router, to the end device. For example, mesh router 102(B) may use its associated certificate 202(B) to sign a certificate 202(B1) that is issued to end device 104(B1). Both of the certificates, certificate 202(B) and certificate 202(B1), may be provided via wireless link 110(B1) from mesh router 102(B) to end device 104(B1).

At block 1006, the end device certificate and the mesh router certificate are stored by the end device. For example, certificate 202(B1) and certificate 202(B) may be stored by end device 104(B1). At block 1008, the end device moves to a new location. For example, after disconnecting from mesh router 102(B), end device 104(B1) may move from being within range of mesh router 102(B) to being within range of mesh router 102(E). As indicated by the asterisk(*), this is an optional action inasmuch as end device 104(B1) may be within range of, and capable of wirelessly communicating with, both of mesh routers 102(B) and 102(E) from a single location.

At block 1010, the end device connects with a neighborhood (but non-affiliated) mesh router. For example, end device 104(B1) may connect with mesh router 102(E) over wireless link 110(E/B1). Mesh router 102(E) is a member of the same neighborhood as that of mesh router 102(B), to which end device 104(B1) is affiliated. In other words, both of mesh router 102(B) and mesh router 102(E) have designated the same neighborhood administrator 404 in mesh router 102(C).

At block 1012, the end device provides both the end device certificate and the mesh router certificate that was used to sign the end device certificate to the non-affiliated neighborhood mesh router. For example, end device 104(B1) may provide certificate 202(B1) and certificate 202(B) to mesh router 102 (E). Alternatively, if mesh router 102(E) has stored a copy of an associated certificate 202 for each mesh router 102 in its neighborhood, end device 104(B1) may merely send certificate 202(B1) and an identifier of mesh router 102(B), which identifier may be included in certificate 202(B1), to mesh router 102(E).

At block 1014, the neighborhood mesh router ascertains if the mesh router associated with the mesh router certificate is a neighborhood member. For example, mesh router 102(E) may access a neighborhood members data structure 902 to ascertain if there is an entry thereof that is directed to/includes mesh router 102(B). If not, then at block 1020 the neighborhood mesh router grants the end device standard access. For example, mesh router 102(E) may grant standard access to end device 104(B1).

If, on the other hand, the neighborhood mesh router does ascertain that the mesh router associated with the mesh router certificate is a neighborhood member (at block 1014), then the method continues at block 1016. At block 1016, the neighborhood mesh router determines whether the end device certificate is valid. For example, mesh router 102(E) may analyze certificate 202(B1), possibly in conjunction with an analysis of certificate 202(B), to determine whether certificate 202(B1) was issued by a private key 206(B) of a legitimate mesh router 102(B). This analysis may involve at least one public key 204(B) operation for a signature verification procedure on a signature of certificate 202(B1).

If it is not determined that the end device certificate is valid (at block 1016), then standard access is granted to the end device by the neighborhood mesh router at block 1020. If, on the other hand, the neighborhood mesh router does determine that the end device certificate is valid (at block 1016), then the method continues at block 1018. At block 1018, the neighborhood mesh router grants preferred access to the end device. For example, mesh router 102(E) may grant preferred access to end device 104(B1). This exemplary method thus implements end device recognition in a wireless mesh network such that an end device may receive privileged access from a non-affiliated mesh router that is a member of the same neighborhood as the mesh router to which the end device is affiliated.

Figure 11:
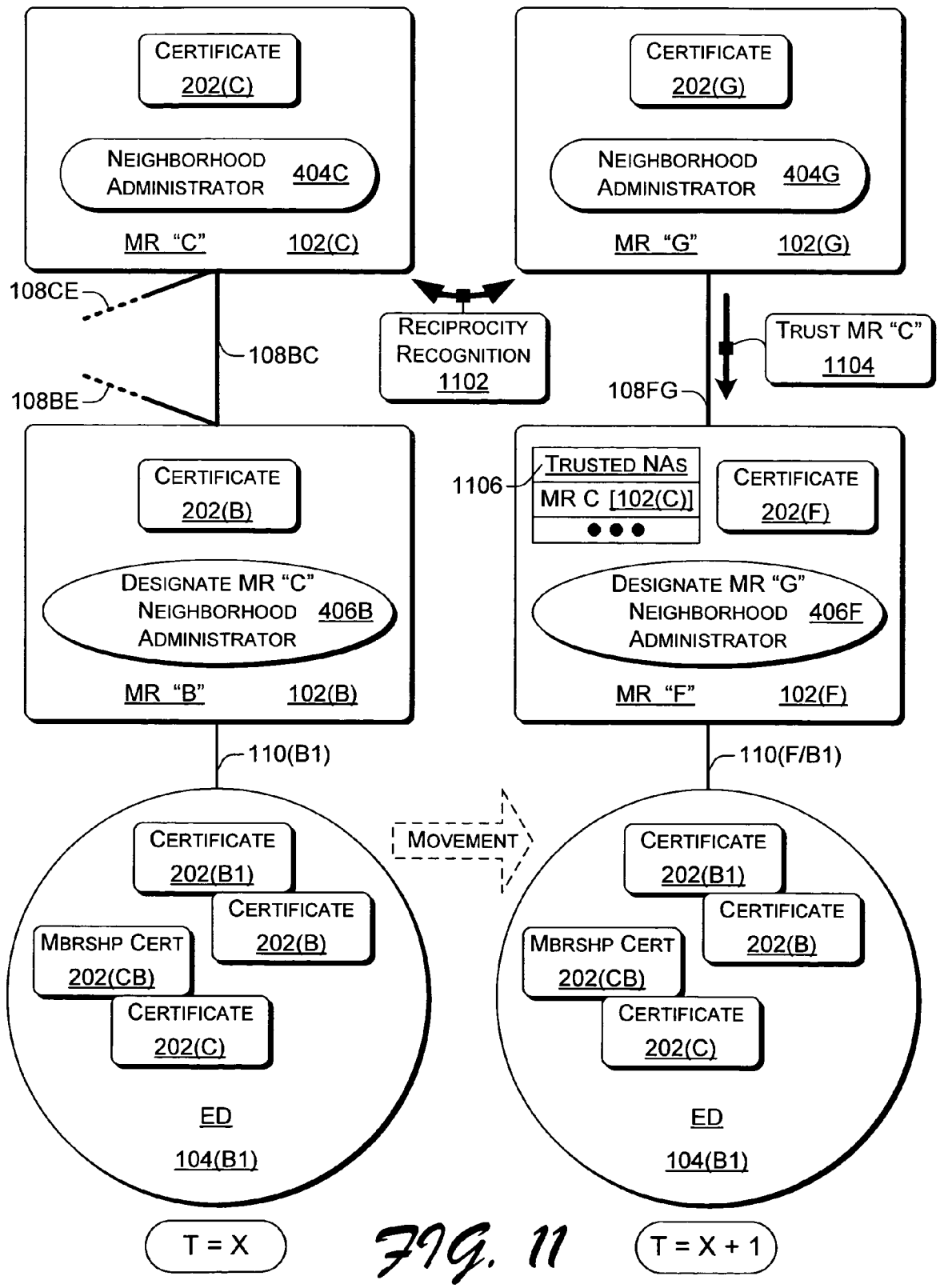
FIG. 11 illustrates another exemplary recognition mechanism with respect to an end device that is engaged in inter-neighborhood movement.

FIG. 11 illustrates another exemplary recognition mechanism with respect to an end device 104(B1) that is engaged in inter-neighborhood movement. End device 104(B1) may move from a first neighborhood, which has as a member its affiliated mesh router 102(B), to a second neighborhood. With this other exemplary recognition mechanism as shown in FIG. 11, end device 104(B1) may be specially recognized by mesh routers 102 that are members of the second neighborhood.

As illustrated, mesh router "C" 102(C) is indicated at 404C as a neighborhood administrator for a first neighborhood. Mesh router 102(B) is a member of the first neighborhood of mesh router 102(C). A mesh router "G" 102(G) is indicated at 404G as a neighborhood administrator for another second neighborhood. A mesh router 102(F) is a member of the second neighborhood of mesh router 102(G). Mesh router 102(F) has designated mesh router "G" as neighborhood administrator at 406F. Mesh router 102(F) is associated with a certificate 202(F), and mesh router 102(G) is associated with a certificate 202(G).

In a described implementation, neighborhood administrators 404C and 404G for mesh routers 102(C) and 102(G), respectively, have agreed to reciprocity recognition 1102. In other words, each of mesh router 102(C) and mesh router 102(G) have agreed to specially recognize end devices 104 that are affiliated with each other's member mesh routers 102. Alternatively, the recognition agreement may be unilateral instead of reciprocal and bilateral.

Mesh router 102(G) is in communication with mesh router 102(F) over wireless link 108FG. Over wireless link 108FG, mesh router 102(G) sends a trust mesh router "C" message 1104 to mesh router 102(F). In other words, mesh router 102(G) is asserting that mesh router 102(C) operates a good and/or trustworthy neighborhood. Mesh router 102(G) is also instructing mesh router 102(F) to specially recognize end devices 104 that are affiliated with mesh routers 102 of the neighborhood of mesh router 102(C) in order to fulfill obligations of being a proper mesh router 102 in the neighborhood of mesh router 102(G).

Mesh router 102(F) includes a data structure 1106 that lists or enumerates neighborhood administrators that are to be trusted. Responsive to the trust mesh router "C" message 1104, mesh router 102(F) adds an entry that includes/identifies mesh router "C" [102(C)]. Data structure 1106 may also include additional entries as indicated by the ellipses. Furthermore, trusted neighborhood administrators data structure 1106 may also be combined with other data structures, including those described otherwise herein. Although not so illustrated in FIG. 11, mesh router 102(B) also includes an analogous trusted neighborhood administrators data structure 1106 that enumerates mesh router "G" [102(G)] when recognition agreement 1102 is reciprocal.

In a described implementation, at time T=X, end device 104(B1) is in communication with mesh router 102(B) over wireless link 110(B1). End device 104(B1) is associated with and includes certificate 202(B1) as signed by certificate 202(B), which is also stored by end device 104(B1). Mesh router 102(B) also provides end device 104(B1) with a membership certificate 202(CB) that is signed by certificate 202(C). Membership certificate 202(CB) and certificate 202(C) are provided to mesh router 102(B) from mesh router 102(C).

Digital certificates can also be used to certify that an entity has a particular attribute(s). Certificates that represent that an entity has a certain attribute are called attribute certificates. When the attribute is membership, the attribute certificate may be termed a membership certificate. Membership certificate 202(CB) represents that mesh router 102(B) is a member of the neighborhood of mesh router 102(C). Membership certificate 202(CB) is signed with certificate 202(C) by mesh router 102(C), which is neighborhood administrator 404C.

At time T=X+1, end device 104(B1) moves from being in range of mesh router 102(B) of the neighborhood of mesh router 102(C) to being in range of mesh router 102(F) of the neighborhood of mesh router 102(G). Mesh router 102(F) and end device 104(B1) establish a connection over wireless link 110(F/B1). Over wireless link 110(F/B1), end device 104(B1) transmits certificate 202(B1), certificate 202(B), membership certificate 202(CB), and certificate 202(C) to mesh router 102(F). In an alternative implementation, membership certificate 202(CB) and/or certificate 202(C) may be provided to mesh router 102(F) from mesh router 102(G).

Mesh router 102(F) uses certificate 202(B1) and certificate 202(B) to ensure that end device 104(B1) is a valid mesh router 102 that is in fact affiliated with mesh router 102(B) via signature verification procedures. Mesh router 102(F) uses membership certificate 202(CB) and certificate 202(C) to ensure that mesh router 102(B) is in fact a member of the neighborhood of mesh router 102(C).

After accessing trusted neighborhood administrators data structure 1106 and locating an entry including/directed to mesh router "C" [102(C)], mesh router 102(F) determines that end devices 104 that are affiliated with mesh routers 102 that are members of the neighborhood of mesh router 102(C) are to be granted specialized recognition. Accordingly, mesh router 102(F) grants end device 104(B1) special recognition. For example, end device 104(B1) may be entitled to preferred access status.

With reference to FIGS. 8-10, it should be noted that attribute certificates 202 may also be used with intra-neighborhood movement implementations in lieu of a neighborhood members data structure 902 approach. For example in such an implementation for the movement of FIG. 9, end device 104(B1) sends mesh router 102(E) a membership attribute certificate 202(CB) (and possibly certificate 202(C)) in addition to certificate 202(B1) and certificate 202(B). Mesh router 102(E) then analyzes the certificates 202 instead of accessing (or storing) data structure 902.

The routers, devices, actions, aspects, features, components, etc. of FIGS. 1-11 are illustrated in diagrams that are divided into multiple blocks. However, the order, interconnections, interrelationships, layout, etc. in which FIGS. 1-11 are described and/or shown is not intended to be construed as a limitation, and any number of the blocks can be modified, combined, rearranged, augmented, omitted, etc. in any manner to implement one or more systems, methods, devices, procedures, media, application programming interfaces (APIs), apparatuses, arrangements, etc. for mesh network implementations. Furthermore, although the description herein includes references to specific implementations (and the exemplary operating environment of FIG. 12 below), the illustrated and/or described implementations can be implemented in any suitable hardware, software, firmware, or combination thereof and using any suitable device architecture(s), coding paradigm(s), communication avenue(s), wireless air interface scheme(s), and so forth.

Figure 12:
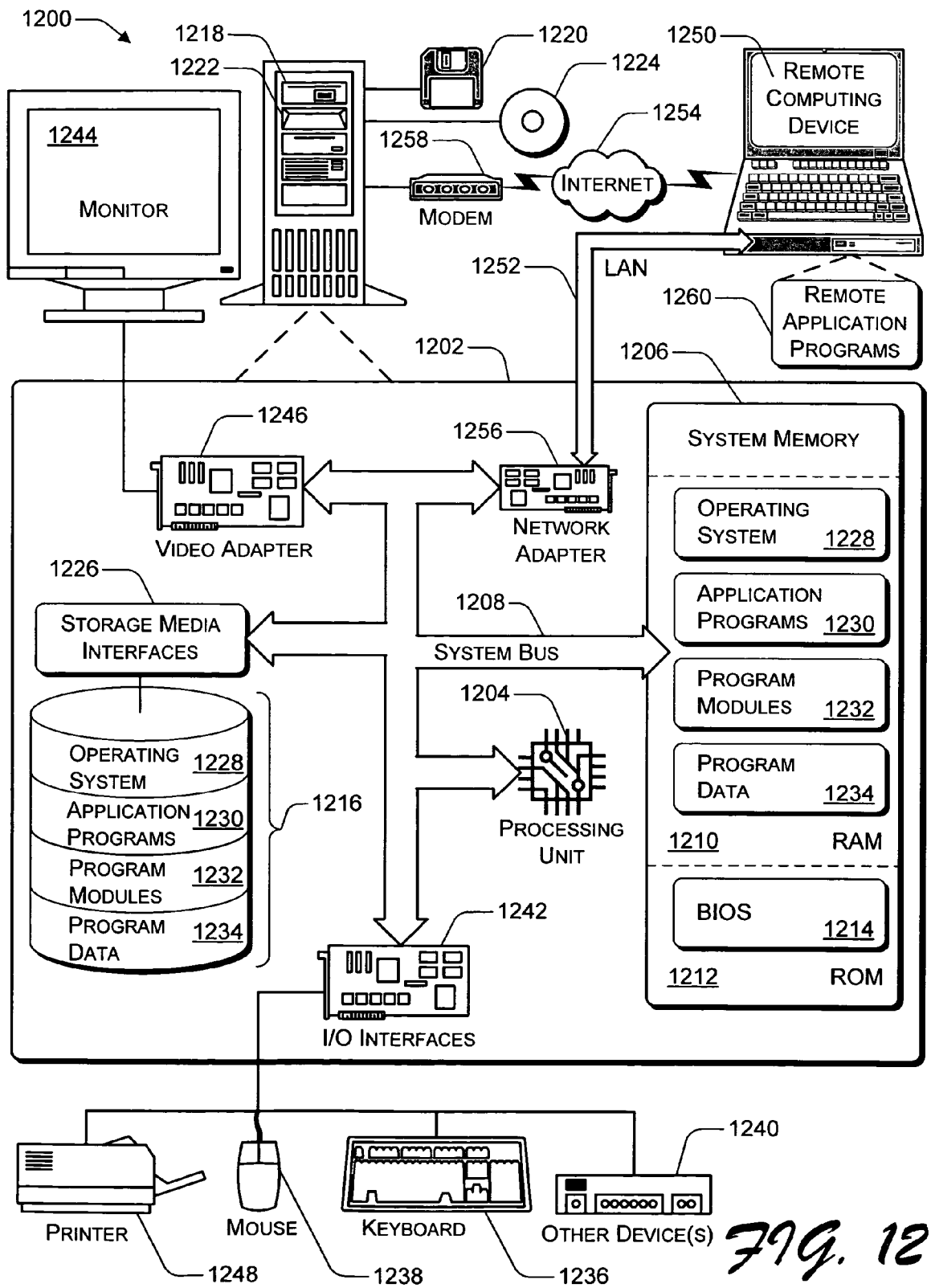
FIG. 12 illustrates an exemplary computing (or general device) operating environment that is capable of (wholly or partially) implementing at least one aspect of mesh networks as described herein.

FIG. 12 illustrates an exemplary computing (or general device) operating environment 1200 that is capable of (fully or partially) implementing at least one system, router, device, apparatus, component, arrangement, protocol, approach, method, procedure, media, API, some combination thereof, etc. for mesh network implementations as described herein. Operating environment 1200 may be utilized in the computer and network architectures described below.

Exemplary operating environment 1200 is only one example of an environment and is not intended to suggest any limitation as to the scope of use or functionality of the applicable device (including computer, network node such as a router or end device, entertainment device, mobile appliance, general electronic device, etc.) architectures. Neither should operating environment 1200 (or the devices thereof) be interpreted as having any dependency or requirement relating to any one or to any combination of components as illustrated in FIG. 12.

Additionally, mesh network implementations may be realized with numerous other general purpose or special purpose device (including computing or wireless system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, wired or wireless network nodes (including general or specialized routers), distributed or multi-processing computing environments that include any of the above systems or devices, some combination thereof, and so forth.

Realizations for mesh network implementations may be described in the general context of processor-executable instructions. Generally, processor-executable instructions include routines, programs, modules, protocols, objects, interfaces, components, data structures, etc. that perform and/or enable particular tasks and/or implement particular abstract data types. Mesh network implementations, as described in certain embodiments herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 1200 includes a general-purpose computing device in the form of a computer 1202, which may comprise any (e.g., electronic) device with computing/processing capabilities. The components of computer 1202 may include, but are not limited to, one or more processors or processing units 1204, a system memory 1206, and a system bus 1208 that couples various system components including processor 1204 to system memory 1206.

Processors 1204 are not limited by the materials from which they are formed or the processing mechanisms employed therein. For example, processors 1204 may be comprised of semiconductor(s) and/or transistors (e.g., electronic integrated circuits (ICs)). In such a context, processor-executable instructions may be electronically-executable instructions. Alternatively, the mechanisms of or for processors 1204, and thus of or for computer 1202, may include, but are not limited to, quantum computing, optical computing, mechanical computing (e.g., using nanotechnology), and so forth.

System bus 1208 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1202 typically includes a variety of processor-accessible media. Such media may be any available media that is accessible by computer 1202 or another (e.g., electronic) device, and it includes both volatile and non-volatile media, removable and non-removable media, and storage and transmission media.

System memory 1206 includes processor-accessible storage media in the form of volatile memory, such as random access memory (RAM) 1240, and/or non-volatile memory, such as read only memory (ROM) 1212. A basic input/output system (BIOS) 1214, containing the basic routines that help to transfer information between elements within computer 1202, such as during start-up, is typically stored in ROM 1212. RAM 1210 typically contains data and/or program modules/instructions that are immediately accessible to and/or being presently operated on by processing unit 1204.

Computer 1202 may also include other removable/non-removable and/or volatile/non-volatile storage media. By way of example, FIG. 12 illustrates a hard disk drive or disk drive array 1216 for reading from and writing to a (typically) non-removable, non-volatile magnetic media (not separately shown); a magnetic disk drive 1218 for reading from and writing to a (typically) removable, non-volatile magnetic disk 1220 (e.g., a "floppy disk"); and an optical disk drive 1222 for reading from and/or writing to a (typically) removable, non-volatile optical disk 1224 such as a CD, DVD, or other optical media. Hard disk drive 1216, magnetic disk drive 1218, and optical disk drive 1222 are each connected to system bus 1208 by one or more storage media interfaces 1226. Alternatively, hard disk drive 1216, magnetic disk drive 1218, and optical disk drive 1222 may be connected to system bus 1208 by one or more other separate or combined interfaces (not shown).

The disk drives and their associated processor-accessible media provide non-volatile storage of processor-executable instructions, such as data structures, program modules, and other data for computer 1202. Although exemplary computer 1202 illustrates a hard disk 1216, a removable magnetic disk 1220, and a removable optical disk 1224, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 1200.

Any number of program modules (or other units or sets of instructions/code) may be stored on hard disk 1216, magnetic disk 1220, optical disk 1224, ROM 1212, and/or RAM 1240, including by way of general example, an operating system 1228, one or more application programs 1230, other program modules 1232, and program data 1234. Such instructions may include module(s) for joining and participating in a wireless mesh network, module(s) for implementing exclusion mechanisms, module(s) for extending the PKI onto the end device tier, mapping data structure(s), and so forth.

A user may enter commands and/or information into computer 1202 via input devices such as a keyboard 1236 and a pointing device 1238 (e.g., a "mouse"). Other input devices 1240 (not shown specifically) may include a microphone, joystick, game pad, satellite dish, serial port, scanner, and/or the like. These and other input devices are connected to processing unit 1204 via input/output interfaces 1242 that are coupled to system bus 1208. However, input devices and/or output devices may instead be connected by other interface and bus structures, such as a parallel port, a game port, a universal serial bus (USB) port, an infrared port, an IEEE 1394 ("Firewire") interface, an IEEE 802.11 or other general wireless interface, a Bluetooth® wireless interface, and so forth.

A monitor/view screen 1244 or other type of display device may also be connected to system bus 1208 via an interface, such as a video adapter 1246. Video adapter 1246 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and the performance of graphics operations. In addition to monitor 1244, other output peripheral devices may include components such as speakers (not shown) and a printer 1248, which may be connected to computer 1202 via input/output interfaces 1242.

Computer 1202 may operate in a networked environment using logical connections to one or more remote computers, such as a remote computing device 1250. By way of example, remote computing device 1250 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1250 is illustrated as a portable computer that may include many or all of the elements and features described herein with respect to computer 1202.

Logical connections between computer 1202 and remote computer 1250 are depicted as a local area network (LAN) 1252 and a general wide area network (WAN) 1254. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 1202 is usually connected to LAN 1252 via a network interface or adapter 1256. When implemented in a WAN networking environment, computer 1202 typically includes a modem 1258 or other component for establishing communications over WAN 1254. Modem 1258, which may be internal or external to computer 1202, may be connected to system bus 1208 via input/output interfaces 1242 or any other appropriate mechanism(s). It is to be appreciated that the illustrated network connections are exemplary and that other manners for establishing communication link(s), including wireless link(s), between computers 1202 and 1250 may be employed.

In a networked environment, such as that illustrated with operating environment 1200, program modules or other instructions that are depicted relative to computer 1202, or portions thereof, may be fully or partially stored in a remote media storage device. By way of example, remote application programs 1260 reside on a memory component of remote computer 1250 but may be usable or otherwise accessible via computer 1202. Also, for purposes of illustration, application programs 1230 and other processor-executable instructions such as operating system 1228 are illustrated herein as discrete blocks, but it is recognized that such programs, components, and other instructions reside at various times in different storage components of computing device 1202 (and/or remote computing device 1250) and are executed by processor(s) 1204 of computer 1202 (and/or those of remote computing device 1250).

Although systems, media, routers, devices, methods, procedures, apparatuses, techniques, APIs, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A router comprising:
   a certificate associated with the router and defined by a producing entity of the router and including a name and a signature, the signature created by performing an operation on the name using a private signing key of the producing entity of the router;
   a list stored in the router, the list:
      enumerating one or more routers each being a member of a predetermined neighborhood of which the router is also a member, the one or more routers each authenticating itself with the router; and
      mapping, for each of the one or more routers in the predetermined neighborhood, a copy of a certificate to a corresponding router;
   at least one processor; and
   one or more media including processor-executable instructions that are capable of being executed by the at least one processor, the processor-executable instructions adapted to direct the router to perform actions comprising:
      receiving, from an end device with which the router has not established trust relationship, a request comprising a first and a second certificate, wherein:
         the first certificate is a certificate of a first router that authenticates the end device, the first certificate comprising a public key of a public-private key pair associated with the first router; and
         the second certificate is a certificate associated with the end device, the second certificate having a signature signed by the first router using a private key of the public-private key pair associated with the first router;
      ascertaining the first router is an authenticated member of the predetermined neighborhood by looking up the first router in the list stored in the router;
      determining the first certificate is valid by comparing the first certificate with a copy in the list of the certificate mapped to the first router;
      determining the second certificated is valid without routing the second certificate to the first router for its validation, the determining comprising performing, at the router, a signature verification procedure on the signature of the second certificate to verify, based on the pubic key in the first certificate, that the signature is signed by the first router; and
      in an event the first router is ascertained to be a member of the predetermined neighborhood and the first and second certificates are determined to be valid, recognizing the end device as having a privileged status; the privileged status relating to level of service.

2. The router as recited in claim 1, wherein the router further comprises:
   a wireless transceiver that enables wireless communication with end devices and/or other routers.

3. The router as recited in claim 1, wherein the receiving action comprises:
   receiving an identification of the first router from the end device.

4. The router as recited in claim 1, wherein the receiving action comprises receiving, from the end device:
   a membership certificate indicating that the first router is a member of the predetermined neighborhood; and
   a certificate of a neighborhood administrator of the predetermined neighborhood, wherein the certificate of the neighborhood administrator signed the membership certificate.

5. The router as recited in claim 1, wherein the list further comprises a secret key shared exclusively between the router and each of the one or more routers in the predetermined neighborhood when the router and each of the one or more routers are mutually authenticated.

6. The router as recited in claim 1, wherein the ascertaining action comprises:
   ascertaining if the first router is a member of the predetermined neighborhood, wherein the predetermined neighborhood comprises a neighborhood to which the router is also a member.

7. The router as recited in claim 1, wherein the ascertaining action comprises:
   ascertaining if the first router is a member of the predetermined neighborhood, wherein the predetermined neighborhood comprises a neighborhood having a neighborhood administrator that is trusted by a neighborhood administrator of a neighborhood to which the router is a member.

8. The router as recited in claim 1, wherein the recognizing action comprises:
   recognizing the end device as being affiliated with the first router wherein the first router is a neighborhood member.

9. The router as recited in claim 1, wherein the recognizing action comprises:
   recognizing the end device as being affiliated with the first router wherein the first router is a member of a neighborhood having reciprocity recognition with a neighborhood to which the router is a member.

10. The router as recited in claim 1, wherein the recognizing action comprises:
   granting the end device preferred access to a wireless mesh network.

11. The router as recited in claim 1, wherein the processor-executable instructions are adapted to cause the router to perform a further action comprising:
   in an event the other router is not ascertained to be a member of the predetermined neighborhood or the at least one of the first and second certificate is not determined to be valid, granting the end device standard access to a wireless mesh network.

12. The router as recited in claim 1, wherein the processor-executable instructions are adapted to cause the router to perform a further action comprising:
   issuing a different certificate to a different end device, the different certificate capable of being recognized by the first router;
   wherein the router and the first router are peers within a wireless mesh network.

13. One or more processor-accessible storage media having processor-executable instructions stored thereon that, when executed by a first router, configure the first router to implement an arrangement module, the arrangement module comprising:
   receiver means for receiving a request form an end device with which the first router has not established trust relationship, the request comprising a first and a second certificate, wherein:
      the first certificate is a certificate of a second router to which the end device is affiliated; and
      the second certificate is a certificate associated with the end device and signed by the second router;
   ascertaining means for ascertaining if the second router is a member of a predetermined neighborhood, the ascertaining comprising looking up the second router in a list locally stored in the first router;
   determination means for determining the first and second certificate are valid, the determination means including operation means for performing a public key operation on the second certificate using a public key from the first certificate that is associated with the second router to which the end device is affiliated, the first certificate defined by a producing entity and including a signature created using a private signing key of the producing entity, wherein the determining is performed at the arrangement module without routing the first and second certificate to the second router for its validation; and
   recognition means for recognizing the end device as having a privileged status responsive to the ascertaining means and the determination means.

14. One or more processor-accessible storage media as recited in claim 13, wherein the recognition means is adapted to recognize the end device as having the privileged status if the ascertainment means ascertains that:
   the second router is a member of the predetermined neighborhood; and
   the first and second certificate are valid.

15. One or more processor-accessible storage media as recited in claim 13, wherein the recognition means comprises means for granting preferred access to the end device responsive to the ascertainment means and the determination means.

16. One or more processor-accessible storage media as recited in claim 13, wherein the ascertainment means comprises:
   data structure means for storing identifications of neighborhood members; and
   access means for checking if the second router is enumerated in the data structure means.

17. One or more processor-accessible storage media as recited in claim 13, wherein the ascertainment means comprises:
   data structure means for storing identifications of one or more trusted neighborhood administrators; and
   access means for checking if one of the one or more neighborhood administrators of the router, as indicated by a membership certificate, is enumerated in the data structure means.

18. One or more processor-accessible storage media as recited in claim 13, wherein the determination means comprises:
   verification means for performing a signature verification procedure on a signature of the second certificate.

19. One or more processor-accessible storage media as recited in claim 13, wherein the router is a mesh router.

20. A mesh router including an associated certificate defined by a producing entity of the mesh router, the associated certificate including a signature created by performing an operation on a name of the mesh router using a private signing key of the producing entity of the mesh router, the mesh router configured to perform action s comprising:
   establishing a connection with an end device over a wireless link in a multi-hop wireless network;
   receiving a request from the end device with which the mesh router has not established trust relationship, the request comprising a certificate associated with the end device, the certificate having a signature from a second mesh router to which the end device is affiliated;
   performing a signature verification procedure on the signature of the certificate without routing the request to the second mesh router for validation by the second mesh router, the signature verification procedure comprising verifying the signature based on available public key of the second mesh router;
   in and event the signature verification procedure is successful, granting the end device preferred access.

21. The mesh router as recited in claim 20, wherein the mesh router is configured to perform further actions comprising:
   receiving an identifier of the second mesh router that issued the certificate to the end device; and
   ascertaining, with regard to the identifier, if the second mesh router is a member of a neighborhood to which the mesh router is also a member.

22. The mesh router as recited in claim 20, wherein the action of receiving comprises:
   receiving a second certificate; wherein the second certificate is associated with the second mesh router.

23. The mesh router as recited in claim 20, wherein the signature is a result of a private key operation using a private key that is associated with the second mesh router.

24. A mesh router that is capable of establishing a wireless mesh network with other mesh routers, the mesh router further capable of designating a neighborhood administrator mesh router; the mesh router adapted to grant privileged status to a particular end device with which the mesh router has not established trust relationship, the particular end device being associated with a particular certificate issued by a particular mesh router other than the mesh router when the particular mesh router is a member of a neighborhood of the designated neighborhood administrator mesh router, the mesh router including an associated certificate defined by a producing entity of the mesh router, the associated certificate including a name and a signature, the signature created by performing an operation on the name using a private signing key of the producing entity of the mesh router, wherein:

the particular certificate associated with the end device comprises a signature signed by a private key of a public-private key pair associated with the particular mesh router;

a signature verification procedure is performed at the mesh router to verify if the particular certificate is signed by the particular mesh router through an available public key of the public-private key pair associated with the particular mesh router without sending the particular certificate to the particular mesh router for its validation.

25. The mesh router as recited in claim 24, wherein the particular certificate associated with the particular en device includes:

a name of the particular end device, and a public key of a public-private key pair that is associated with the particular end device.

26. The mesh router as recited in claim 24, wherein the mesh router is further adapted to grant preferred access to the particular end device with regard to the wireless mesh network of which the mesh router forms a node.

27. The mesh router as recited in claim 24, wherein the mesh router is further adapted to recognize certificates that have been hierarchically issued to end device by the other mesh routers that are peers to the mesh router and members of a predetermined neighborhood.

28. The mesh router as recited in claim 27, wherein the predetermined neighborhood comprises at least one of:

the neighborhood of the designated neighborhood administrator mesh router and a neighborhood having a trusted neighborhood administrator mesh router.

29. The mesh router as recited in claim 24, wherein the mesh router is further adapted to grant privileged status to a given end device associated with a given certificate issued by a given mesh router when the given mesh router is a member of a neighborhood having a trusted neighborhood administrator mesh router.

30. A method of enabling end device recognition at a first router, the method comprising:

receiving, at the first router, a request from an end device with which the first router has not established trust relationship, the request comprising a first and a second certificate, wherein:

the first certificate is a certificate of a second router to which the end device is affiliated, the first certificate comprising a public key of a public-private key pair associated with the second router; and the second certificate is a certificate associated with the end device and having a signature signed by the second router using a private key of the public-private key pair associated with the second router;

ascertaining the second router is a member of a predetermined neighborhood by looking up the second router in a list, wherein the list enumerates all members of the predetermined neighborhood and the list is stored in the first router;

determining the second certificate is valid without routing the second certificate to the second router for its validation, the determining comprising performing, at the first router, a signature verification procedure on the signature of the second certificate to verify, based on the public key in the first certificate, that the signature is signed by the second router; and recognizing the end device as having a privileged status in an event the second router is a member of the predetermined neighborhood and the second certificate passes the signature verification procedure.

31. The method as recited in claim 30, further comprising:

signing, by the second router, the second certificate using a private key of the second router; and issuing, by the second router, the second certificate to the end device.

32. The method as recited in claim 30, further comprising:

connecting, by the end device, to a neighborhood router; and providing, by the end device, the second certificate and the first certificate of the second router to the neighborhood router;

wherein the neighborhood router performs the receiving, the ascertaining, the determining, and the recognizing.

33. One or more processor-accessible media comprising processor-executable instructions that, when executed, direct a router to perform the method as recited in claim 30.

34. The method as recited in claim 30, wherein the ascertaining comprises:

accessing a list that enumerates at least one of:

routers that are members of a same neighborhood and trusted neighborhood administrators.

35. The method as recited in claim 30, wherein the ascertaining comprises:

accessing the list that enumerates trusted neighborhood administrators with reference to a membership certificate representing that the second router is a member of a neighborhood having a given neighborhood administrator.

* * * * *

UNITED STATES PATENT AND TRADEMARK OFFICE
CERTIFICATE OF CORRECTION

PATENT NO. : 7,489,645 B2  
APPLICATION NO. : 10/738802  
DATED : February 10, 2009  
INVENTOR(S) : Daniel R. Simon et al.

Page 1 of 1

It is certified that error appears in the above-identified patent and that said Letters Patent is hereby corrected as shown below:

In column 20, line 8, in Claim 1, delete "a" and insert -- the --, therefor.

In column 20, line 10, in Claim 1, delete "certificated" and insert -- certificate --, therefor.

In column 21, line 26, in Claim 13, delete "form" and insert -- from --, therefor.

In column 21, line 34, in Claim 13, delete "ascertaining" and insert -- ascertainment --, therefor.

In column 21, line 50, in Claim 13, delete "ascertaining" and insert -- ascertainment --, therefor.

In column 22, line 24, in Claim 20, delete "action s" and insert -- actions --, therefor.

In column 22, line 38, in Claim 20, delete "and" and insert -- an --, therefor.

In column 23, line 14, in Claim 25, delete "en" and insert -- end --, therefor.

In column 23, line 25, in Claim 27, delete "device" and insert -- devices --, therefor.

Signed and Sealed this  
Third Day of May, 2011

David J. Kappos  
*Director of the United States Patent and Trademark Office*